United States Patent
Seo et al.

(10) Patent No.: US 11,061,128 B2
(45) Date of Patent: Jul. 13, 2021

(54) METHOD AND DEVICE FOR MEASURING DISTANCE IN WIRELESS COMMUNICATION SYSTEM

(71) Applicant: LG Electronics Inc., Seoul (KR)

(72) Inventors: Hanbyul Seo, Seoul (KR); Changhwan Park, Seoul (KR); Sukhyon Yoon, Seoul (KR); Hyukjin Chae, Seoul (KR); Jiwon Kang, Seoul (KR); Kijun Kim, Seoul (KR); Byounghoon Kim, Seoul (KR); Joonkui Ahn, Seoul (KR); Sangrim Lee, Seoul (KR)

(73) Assignee: LG Electronics Inc., Seoul (KR)

(*) Notice: Subject to any disclaimer, the term of this patent is extended or adjusted under 35 U.S.C. 154(b) by 91 days.

(21) Appl. No.: 16/495,240

(22) PCT Filed: Mar. 22, 2018

(86) PCT No.: PCT/KR2018/003357
§ 371 (c)(1),
(2) Date: Sep. 18, 2019

(87) PCT Pub. No.: WO2018/174596
PCT Pub. Date: Sep. 27, 2018

(65) Prior Publication Data
US 2020/0088866 A1   Mar. 19, 2020

Related U.S. Application Data

(60) Provisional application No. 62/475,194, filed on Mar. 22, 2017, provisional application No. 62/475,197, filed on Mar. 22, 2017.

(51) Int. Cl.
*H04W 4/00* (2018.01)
*G01S 13/36* (2006.01)
(Continued)

(52) U.S. Cl.
CPC .............. *G01S 13/36* (2013.01); *G01S 7/352* (2013.01); *H04L 5/0007* (2013.01);
(Continued)

(58) Field of Classification Search
None
See application file for complete search history.

(56) References Cited

U.S. PATENT DOCUMENTS 7,742,550 B2   6/2010   Olsen et al.
9,607,517 B2 * 3/2017   Schrabler .............. G08G 1/166
(Continued)

FOREIGN PATENT DOCUMENTS

KR   1020080063441   7/2008
KR   1020110009551   1/2011
(Continued)

*Primary Examiner* — Bob A Phunkulh
(74) *Attorney, Agent, or Firm* — Dentons US LLP

(57) ABSTRACT

According to one embodiment, a distance technique between a transmitter and a receiver for processing a signal in symbol units is presented. According to the embodiment, the transmitter transmits a transmission signal to the receiver through preset first and second frequencies. Then, the transmitter receives, from the receiver, a reception signal corresponding to the transmission signal. The reception signal includes a first reception component corresponding to the first frequency and a second reception component corresponding to the second frequency. The phase difference set by the receiver is applied between the phase of the first reception component and the phase of the second reception component. The phase difference is set on the basis of the difference between a reception time at which the transmission signal is received by the receiver and a processing time at which the transmission signal is processed in the receiver.

8 Claims, 19 Drawing Sheets

(51) Int. Cl.
  *G01S 7/35* (2006.01)
  *H04L 5/00* (2006.01)
  *H04L 27/26* (2006.01)
  *G01S 13/42* (2006.01)

(52) U.S. Cl.
  CPC ........ *H04L 27/265* (2013.01); *H04L 27/2665* (2013.01); *G01S 7/356* (2021.05); *G01S 13/42* (2013.01)

(56) References Cited

U.S. PATENT DOCUMENTS

| | | | |
|---|---|---|---|
| 2002/0094786 A1 | 7/2002 | Berliner et al. | |
| 2004/0170227 A1* | 9/2004 | Frank | H04L 27/2657 375/260 |
| 2007/0023520 A1* | 2/2007 | Miyashita | G01S 13/825 235/451 |
| 2009/0029715 A1* | 1/2009 | Burchardt | H04W 64/00 455/456.1 |
| 2009/0243932 A1* | 10/2009 | Moshfeghi | G01S 13/38 342/378 |
| 2013/0273935 A1 | 10/2013 | Amizur et al. | |
| 2013/0310074 A1* | 11/2013 | Porzio Giusto | H04W 4/023 455/456.1 |
| 2015/0256974 A1* | 9/2015 | Zobenko | H04W 4/021 455/456.3 |
| 2015/0365992 A1* | 12/2015 | Lim | H04W 24/10 370/329 |
| 2016/0282457 A1* | 9/2016 | Mazzaro | G01S 13/106 |
| 2017/0067989 A1* | 3/2017 | Nielsen | G01S 17/36 |
| 2017/0074979 A1* | 3/2017 | Nielsen | G01S 13/36 |
| 2017/0102448 A1* | 4/2017 | Dackefjord | G01S 5/0263 |
| 2019/0227158 A1* | 7/2019 | Kilian | G01S 5/00 |

FOREIGN PATENT DOCUMENTS

| | | |
|---|---|---|
| KR | 1020140015394 | 2/2014 |
| WO | 2014119861 | 8/2014 |

* cited by examiner

METHOD AND DEVICE FOR MEASURING DISTANCE IN WIRELESS COMMUNICATION SYSTEM

This application is the National Stage filing under 35 U.S.C. 371 of International Application No. PCT/KR2018/003357, filed on Mar. 22, 2018, which claims the benefit of U.S. Provisional Applications No. 62/475,194 filed on Mar. 22, 2017, and No. 62/475,197 filed on Mar. 22, 2017, the contents of which are all hereby incorporated by reference herein in their entirety.

TECHNICAL FIELD

The present disclosure relates to relates to a wireless communication system, and more particularly, to a method and apparatus for measuring distance in a wireless communication system.

RELATED ART

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

The above-described D2D communication may be expanded and applied to signal transmission and/or reception between vehicles. Most particularly, vehicle-related communication is referred to as vehicle-to-everything (V2X) communication.

In V2X, the term 'X' may refer to a pedestrian, a vehicle, an infrastructure/network, and so on, which may be respectively indicated as V2P, V2V, and V2I/N.

Meanwhile, a wireless communication system may transmit signals by using semi-persistent scheduling (SPS). Herein, semi-persistent scheduling (SPS) corresponds to a scheduling method that first determines in advance a cycle period for transmitting a signal through a higher layer signal and then transmits a signal by using a modulation and coding scheme (MCS), a resource, and so on, which are indicated by a control channel according to the pre-determined cycle period, while directing (or instructing) activation of SPS through the control channel when announcing (or notifying) a specific resource. The signal transmission according to the above-described SPS may also be used in the V2X communication.

Meanwhile, a device-to-device direct link may also be referred to as a sidelink. Both a dynamic method and a semi-persistent method may be used as the scheduling method in a sidelink.

SUMMARY

The present disclosure provides a distance measuring scheme having improved performance Specifically, the present disclosure provides an improved distance measuring scheme between entities in a wireless communication system.

The present specification proposes a method for measuring a distance between a transmitter and a receiver, which process a signal in symbol units, in a wireless communication system including the transmitter and the receiver, and a transmitter and/or a receiver for implementing the method.

In an aspect, there is provided a method for measuring a distance between a transmitter and a receiver for processing a signal in symbol units. The method includes transmitting, by the transmitter, a transmission signal to the receiver through preset first and second frequencies, receiving, by the transmitter, a reception signal in response to the transmission signal from the receiver, and calculating, by the transmitter, a distance between the transmitter and the receiver based on a first reception component for the first frequency and a second reception component for the second frequency, in which the reception signal includes the first reception component and the second reception component, a phase difference, which is set by the receiver, is applied between a phase of the first reception component and a phase of the second reception component, and the phase difference is set based on a difference between a reception time point at which the transmission signal is received by the receiver and a processing time point at which the transmission signal is processed in the receiver.

According to embodiments of the present specification, distance measurement with improved performance is possible even when synchronization between entities of a wireless communication system is not secured. According to embodiments of the present specification, improved performance is shown in distance measurement between vehicles or distance measurement between entities in a wireless communication system.

DESCRIPTION OF EXEMPLARY EMBODIMENTS

The present disclosure provides a method and apparatus for transmitting control information in a wireless communication system supporting vehiclerier aggregation (CA) in a wireless communication system. For clarity, the following description will be based on 3GPP LTE supporting vehiclerier aggregation (CA) and its evolution, but the present disclosure is not limited thereto.

Long Term Evolution (LTE) by the 3rd Generation Partnership Project (3GPP) standardization organization is part of Evolved-UMTS (E-UMTS) using the Evolved-Universal Terrestrial Radio Access Network (E-UTRAN), and adopts Orthogonal Frequency Division Multiple Access (OFDMA) in downlink and adopts Single Vehiclerier-Frequency Division Multiple Access (SC-FDMA) in uplink. LTE-A (Advanced) is the evolution of LTE.

Figure 1:
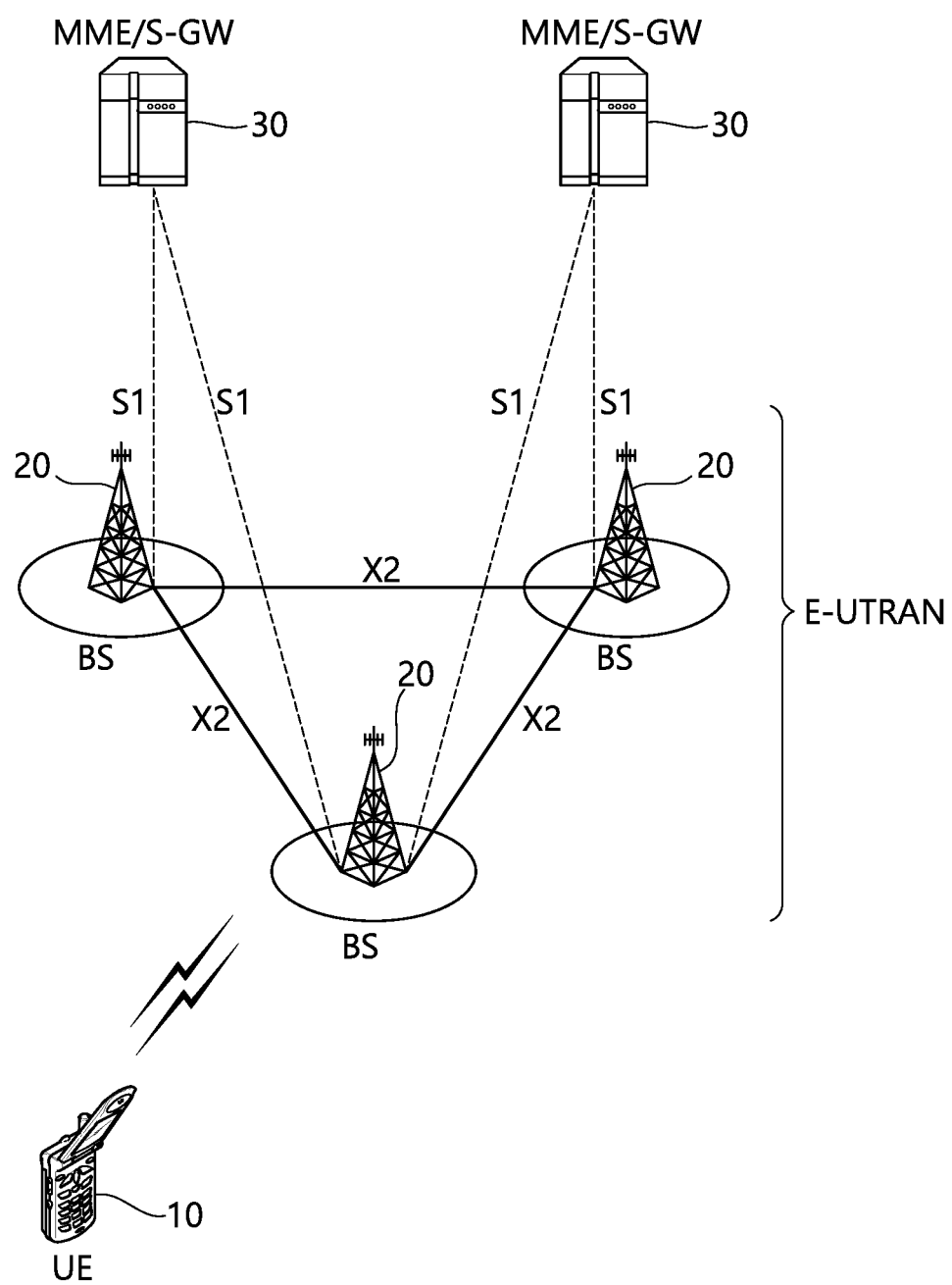
FIG. 1 shows a wireless communication system.

FIG. 1 shows a wireless communication system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, technical features applied to layers are explained.

Figure 2:
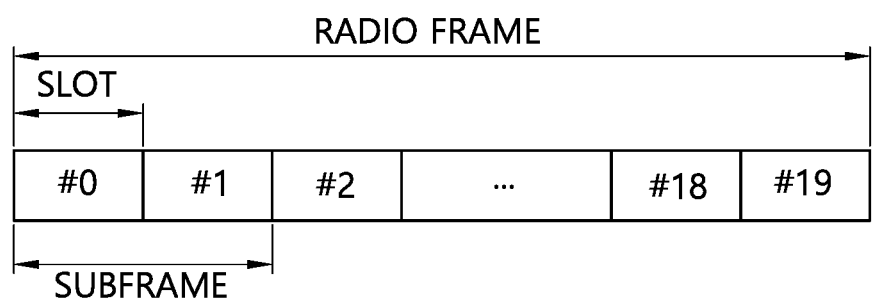
FIG. 2 shows a radio frame structure.

FIG. 2 shows the structure of a radio frame.

Referring to FIG. 2, the radio frame includes 10 subframes, and one subframe includes two slots. The length of one subframe may be 1 ms, and the length of one slot may be 0.5 ms. The time that it takes to transmit one subframe is called a Transmission Time Interval (TTI). The TTI may be a minimum scheduling unit.

One slot may include a plurality of Orthogonal Frequency Division Multiplexing (OFDM) symbols in the time domain. The OFDM symbol is used to represent one symbol period because 3GPP LTE uses OFDMA in downlink and may be called another terminology according to a multiple access scheme. For example, if SC-FDMA is used as an uplink multiple access scheme, corresponding symbols may be called SC-FDMA symbols. One slot is illustrated as including 7 OFDM symbols, but the number of OFDM symbols included in one slot may be changed depending on the length of a Cyclic Prefix (CP). In accordance with 3GPP TS 36.211 V8.5.0 (2008-12), 1 subframe includes 7 OFDM symbols in a normal CP, and 1 subframe includes 6 OFDM symbols in an extended CP. The structure of the radio frame is only an example, and the number of subframes included in the radio frame and the number of slots included in the subframe may be changed in various ways.

Figure 3:
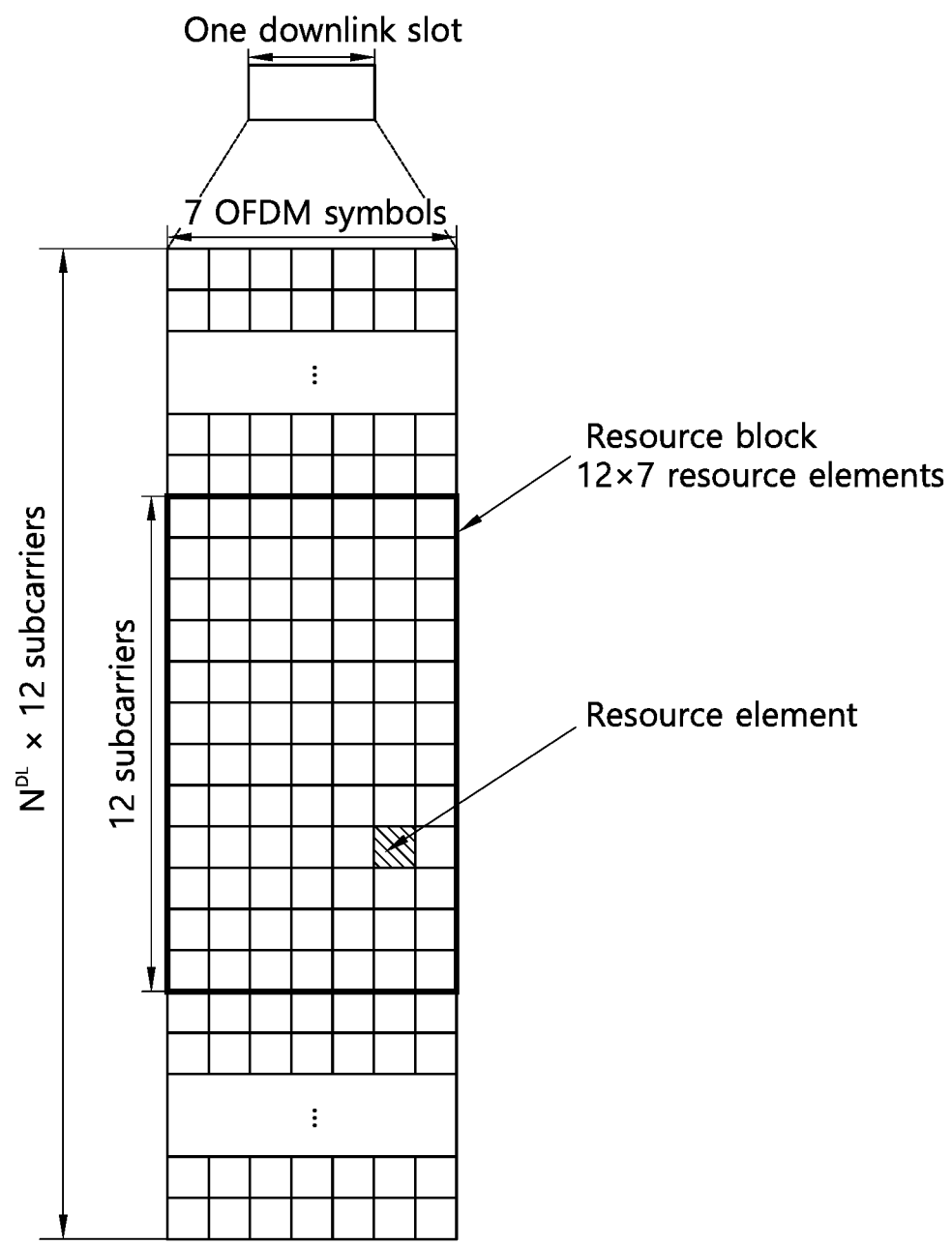
FIG. 3 shows an example of a resource grid for one downlink slot.

FIG. 3 shows an example of a resource grid for one downlink slot.

Referring to FIG. 3, the downlink slot includes a plurality of OFDM symbols in the time domain and includes NRB Resource Blocks (RBs) in the frequency domain. The resource block is a resource allocation unit, and it includes one slot in the time domain and includes a plurality of contiguous subcarriers in the frequency domain.

The number of resource blocks NRB included in a downlink slot depends on a downlink transmission bandwidth configured in a cell. For example, in an LTE system, the number of resource blocks NRB may be any one of 6 to 110. An uplink slot may have the same structure as the downlink slot.

Each of elements on the resource grid is called a Resource Element (RE). The resource elements on the resource grid may be identified by an index pair (k, 1) within a slot. Here, k (k=0, NRBx12-1) indicates a subcarrier index in the frequency domain, and 1 (l=0, . . . , 6) indicates an OFDM symbol index in the time domain.

In FIG. 3, one resource block is illustrated as including 7×12 resource elements, including 7 OFDM symbols in the time domain and 12 subcarriers in the frequency domain. However, the number of OFDM symbols and the number of subcarriers within a resource block are not limited thereto. The number of OFDM symbols and the number of subcarriers may be changed in various ways depending on the length of a CP, frequency spacing, etc. For example, the number of OFDM symbols is 7 in case of a normal CP, and the number of OFDM symbols is 6 in case of an extended CP. One of 128, 256, 512, 1024, 1536, and 2048 may be selected and used as the number of subcarriers in one OFDM symbol.

Figure 4:
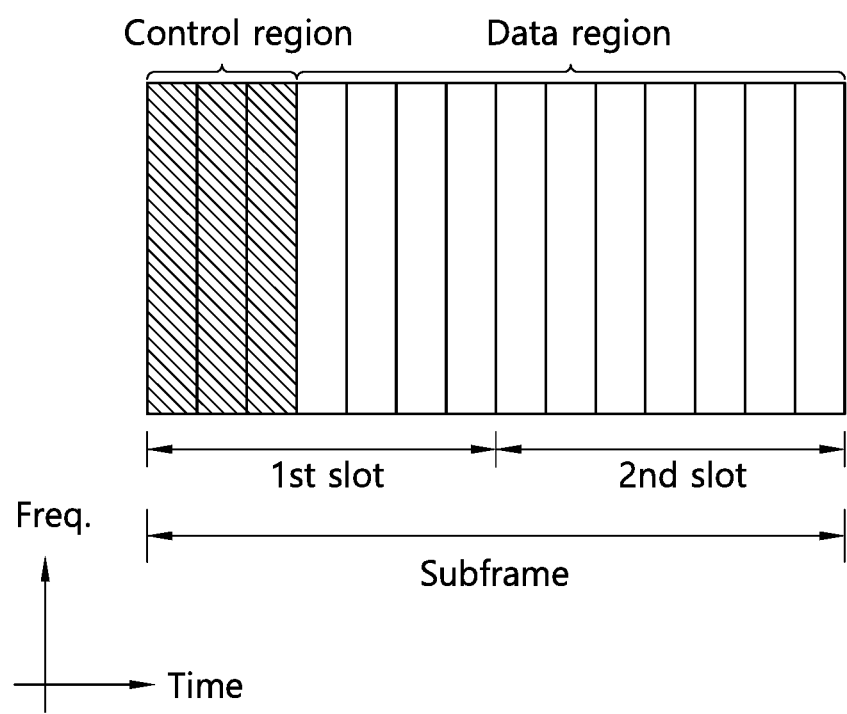
FIG. 4 shows an example of a downlink subframe structure in 3GPP LTE.

FIG. 4 shows an example of the structure of a downlink subframe in 3GPP LTE. The subframe includes two consecutive slots. A maximum of three former OFDM symbols of a first slot within the downlink subframe become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid ARQ indicator channel (PHICH), in addition to the PDCCH can be allocated to the control region. UE can read data information transmitted through the PDSCHs by decoding control information transmitted through the PDCCH. Here, the control region is illustrated as including the 3 OFDM symbols, but this is only illustrative. The PDCCH carries a downlink grant that informs the allocation of the resources of downlink transmission on the PDSCH. More particularly, the PDCCH can carry the allocation of the resources of the transport format of a downlink shared channel (DL-SCH), paging information on a paging channel (PCH), system information on a DL-SCH, the allocation of the resources of a higher layer control message, such as a random access response transmitted on a PDSCH, a transmission power control command, and the activation of a voice over IP (VoIP). Furthermore, the PDCCH carries an uplink grant that informs UE of the allocation of resources of uplink transmission. The number of OFDM symbols included in the control region within the subframe can be known by a PCFICH. The PHICH carries Hybrid Automatic Repeat reQuest (HARQ) acknowledgment (ACK)/negative-acknowledgement (NACK) signals in response to uplink transmission.

Figure 5:
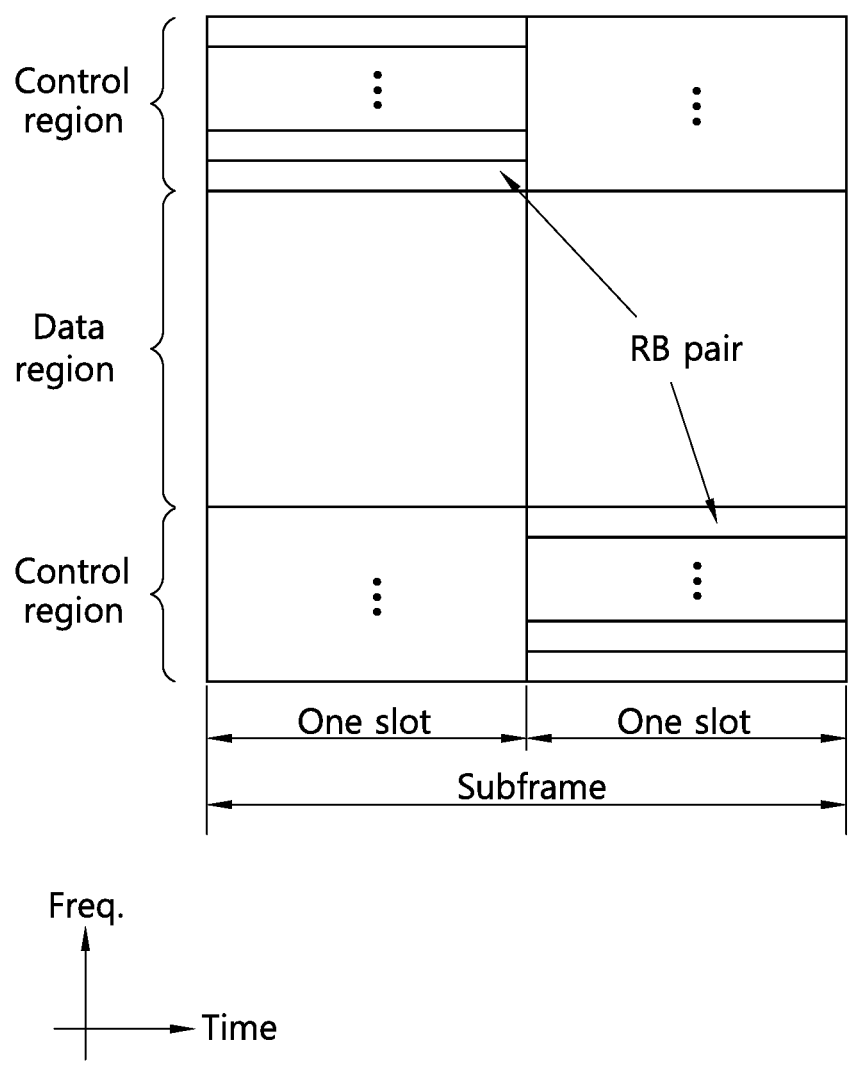
FIG. 5 shows a structure of an uplink subframe.

FIG. 5 shows the structure of an uplink subframe.

Referring to FIG. 5, the uplink subframe can be divided into a control region and a data region in the frequency domain. A physical uplink control channel (PUCCH) on which uplink control information is transmitted is allocated to the control region. A physical uplink shared channel (PUSCH) on which data (control information may also be transmitted according to circumstances) is transmitted is allocated to the data region. UE may transmit a PUCCH and a PUSCH at the same time or may transmit only one of a PUCCH and a PUSCH depending on a configuration.

A PUCCH for an MS is allocated in the form of a resource block pair (RB pair) in the subframe. Resource blocks that belong to the resource block pair occupy different subcarriers in a first slot and a second slot. A frequency that is occupied by the resource blocks belonging to the resource block pair to which a PUCCH is allocated is changed on the basis of a slot boundary. This is said that the RB pair allocated to the PUCCH has been subjected to frequency-hopped at the slot boundary. UE can obtain a frequency diversity gain by transmitting uplink control information through different subcarriers according to the time.

A Hybrid Automatic Repeat reQuest (HARQ) acknowledgement (ACK)/non-acknowledgement (NACK), and Channel Status Information (CSI) (e.g., a Channel Quality Indicator (CQI), a Precoding Matrix Index (PMI), a Precoding Type Indicator (PTI), and a Rank Indication (RI)) indicating a downlink channel state can be transmitted on the PUCCH.

The PUSCH is mapped to an UL-Uplink Shared Channel (SCH), that is, a transport channel. Uplink data transmitted on the PUSCH may be a transport block, that is, a data block for the UL-SCH transmitted during a TTI. The transport block may include user data. Or, the uplink data may be multiplexed data. The multiplexed data may be the multiplexing of the transport block for the UL-SCH and channel status information. For example, the channel status information multiplexed into the data may be a CQI, a PMI, or an RI. Or, the uplink data may include only the channel status information.

Figure 6:
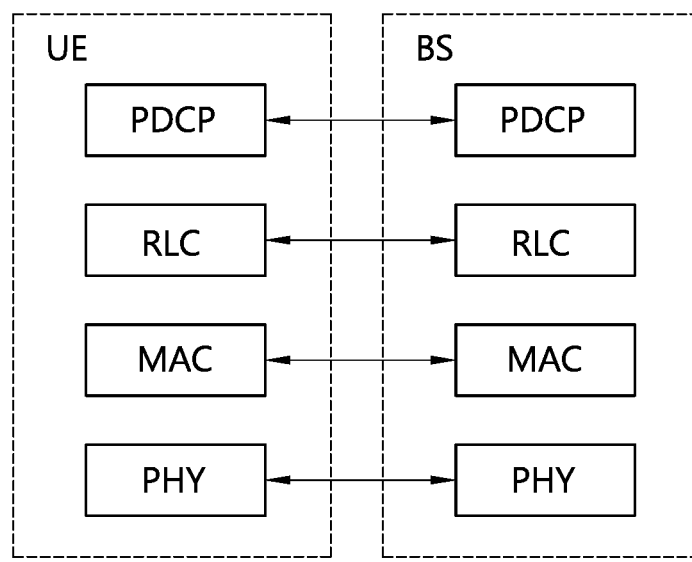
FIG. 6 is a block diagram illustrating a radio protocol architecture for a user plane.
Figure 7:
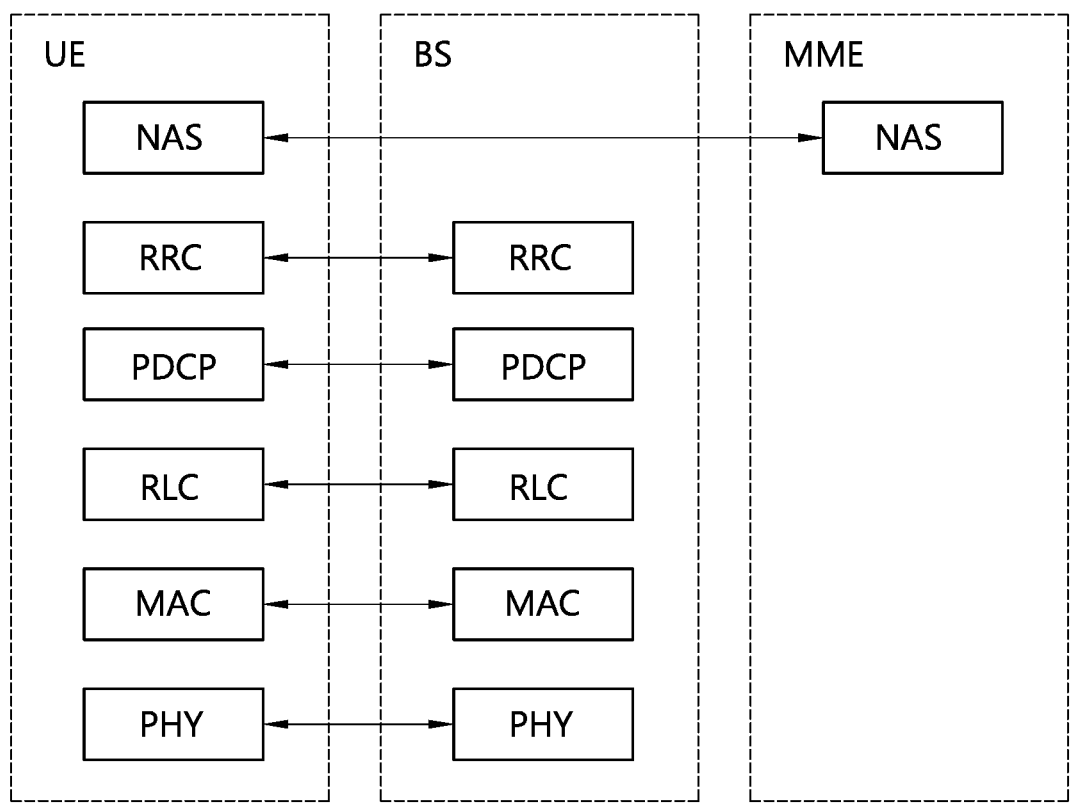
FIG. 7 is a block diagram showing a radio protocol structure for a control plane.

FIG. 6 is a diagram showing a wireless protocol architecture for a user plane. FIG. 7 is a diagram showing a wireless protocol architecture for a control plane. The user plane is a protocol stack for user data transmission. The control plane is a protocol stack for control signal transmission.

Referring to FIGS. 6 and 7, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described.

In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 8:
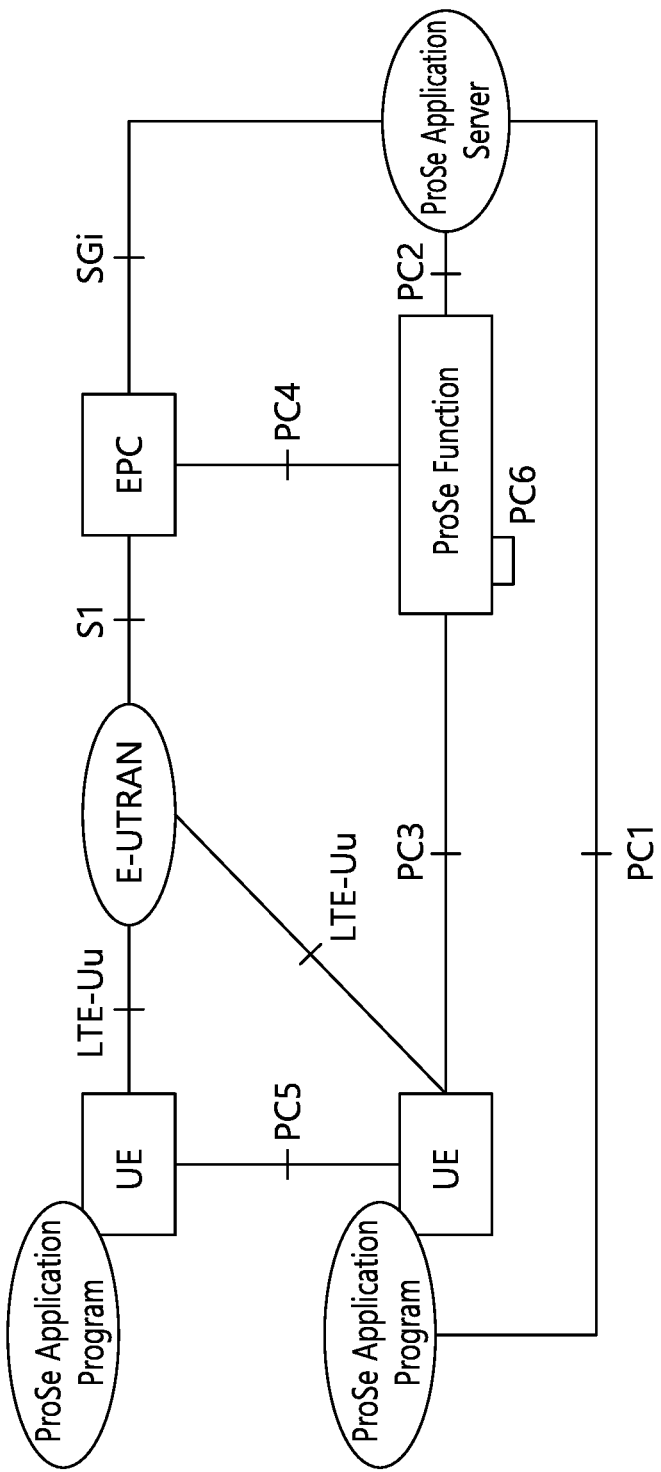
FIG. 8 shows a reference structure for ProSe.

FIG. 8 shows a basic structure for ProSe.

Referring to FIG. 8, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 9:
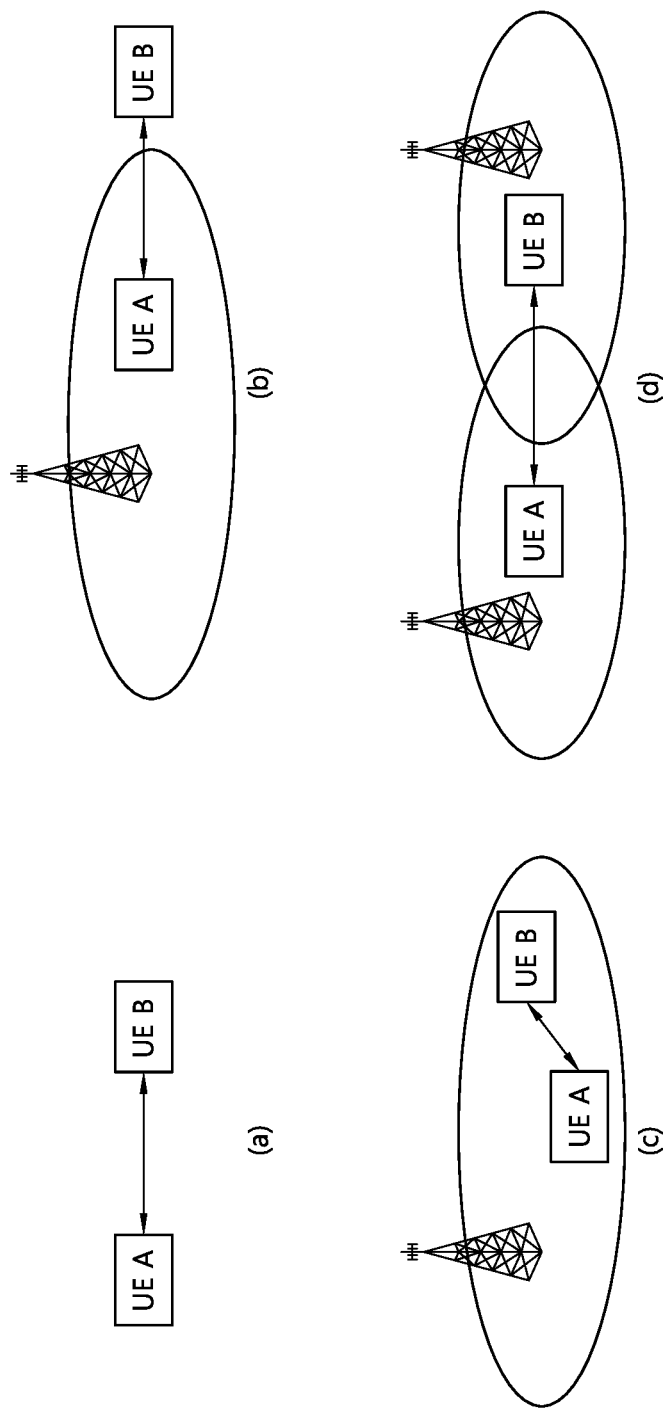
FIG. 9 shows examples of arrangement of UEs performing a D2D operation and cell coverage.

FIG. 9 shows the deployment examples of types of UE performing ProSe direct communication and cell coverage.

Referring to FIG. 9(a), types of UE A and B may be placed outside cell coverage. Referring to FIG. 9(b), UE A may be placed within cell coverage, and UE B may be placed outside cell coverage. Referring to FIG. 9(c), types of UE A and B may be placed within single cell coverage. Referring to FIG. 9(d), UE A may be placed within coverage of a first cell, and UE B may be placed within coverage of a second cell. ProSe direct communication may be performed between types of UE placed at various positions as in FIG. 9.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 10:
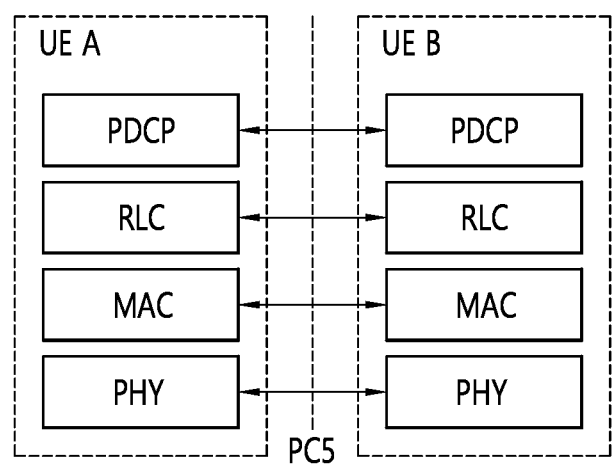
FIG. 10 illustrates a user plane protocol stack for ProSe direct communication.

FIG. 10 illustrates a user-plane protocol stack for the ProSe direction communication.

Referring to FIG. 10, the PC 5 interface is configured of PDCH, RLC, MAC, and PHY layers.

In the ProSe direct communication, there may be no HARQ feedback. A MAC header may include a Source Layer-2 ID and a Target Layer-2 ID.

Figure 11:
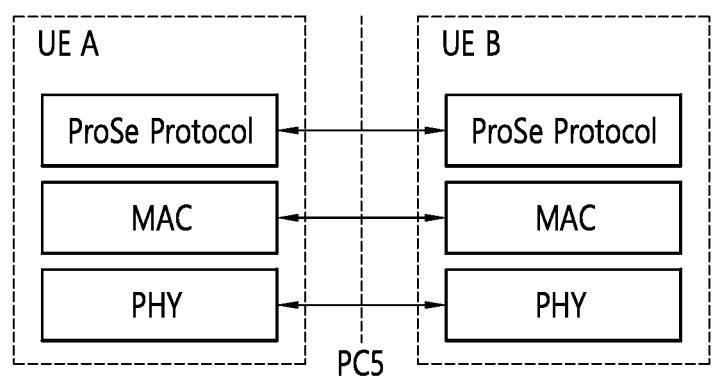
FIG. 11 shows a PC 5 interface for D2D discovery.

FIG. 11 illustrates a PC 5 interface for D2D discovery.

Referring to FIG. 11, the PC 5 interface is configured of a MAC layer, a PHY layer, and a ProSe Protocol layer, which corresponds to a higher-level layer. The higher-level layer (ProSe Protocol) is in charge of authorizing announcement (or notification) and monitoring of discovery information, and content of the discovery information is transparent to Access Stratum. The ProSe Protocol allows only the discovery information that is valid for the announcement to be delivered to the AS.

The MAC layer receives the discovery information from the higher-level layer. The IP layer is not used for the discovery information transmission. The MAC layer determines (or decides) the resource that is to be used for announcing the discovery information received from the higher-level layer. The MAC layer generates a MAC protocol data unit (PDU), which carries the discovery information, and transmits the generated MAC PDU to the physical layer. Herein, a MAC header is not added.

The above-described operation may also be applied to vehicle-to-everything (V2X). Hereinafter, a device-to-device directly link may be referred to as a sidelink.

Hereinafter, the present disclosure will be described in detail.

<Distance Measurement Technique>

The method/apparatus in accordance with the following distance measurement techniques may be utilized in using distance, direction, and location between wireless communication systems. The following method/apparatus may be applied to the above-described V2X or may be utilized in general wireless communication. For example, it may be used to measure the distance between a particular entity (e.g., a vehicle) and another entity in a V2X system, or to measure the coordinates of a particular entity on a 3GPP network.

In the conventional 3GPP LTE system, the position was measured based on Observed Time Difference Of Arrival (OTDOA). OTDOA is a technology embodied through 3GPP Rel-9 and the like and uses at least three base stations including a serving base station. Specifically, in order to measure the location of a UE, two hyperbolic equations are generated based on Reference Signal Time Difference (RSTD) information of the base station downlink signal, and an operation for obtaining a solution of the equation is performed. However, for distance measurement based on OTDOA, time synchronization between entities transmitting signals for distance measurement should be ensured.

The distance measuring technique according to the present specification does not need to secure time synchronization of the transmitter and the receiver, as described below, and provides higher accuracy than the conventional technique. As a result, it can be applied to a V2X system requiring accurate distance measurement, and can be applied to various systems requiring precise distance measurement.

The distance measurement technique according to the present specification may include a method of measuring a distance between wireless communication devices. For example, the apparatuses (i.e., the transmitter and the receiver) that are subject to the distance measurement may measure the distance by using phase information of radio signals transmitted from each other. In the following example, a situation of transmitting and receiving a signal using two frequencies w1 and w2 has been described, but the number of frequencies used for transmission and reception may be variously determined. In addition, the examples described below assume a situation of transmitting a plurality of frequencies at the same time, but it is also possible to apply the principles of the present specification in consideration of the transmission at a different predetermined time point.

Hereinafter, a specific example of the distance measuring technique according to the present specification will be described based on equations, and then the specific technique according to the present specification will be described through generalized terms.

When observing a radio signal transmitted at a specific point with an angular frequency w at a time t at a point place away from the transmission point by x, the observed signal is expressed by the following equation.

$$E(w,t,x)=A(x)*\exp(j*(w*t-k*x+\phi))$$ [Equation 1]

In the Equation, A means the amplitude (amplitude) of the radio signal at the location, k means a variable that satisfies the condition of $$k = \frac{w}{c},$$

and c means the speed of light.

Figure 12:
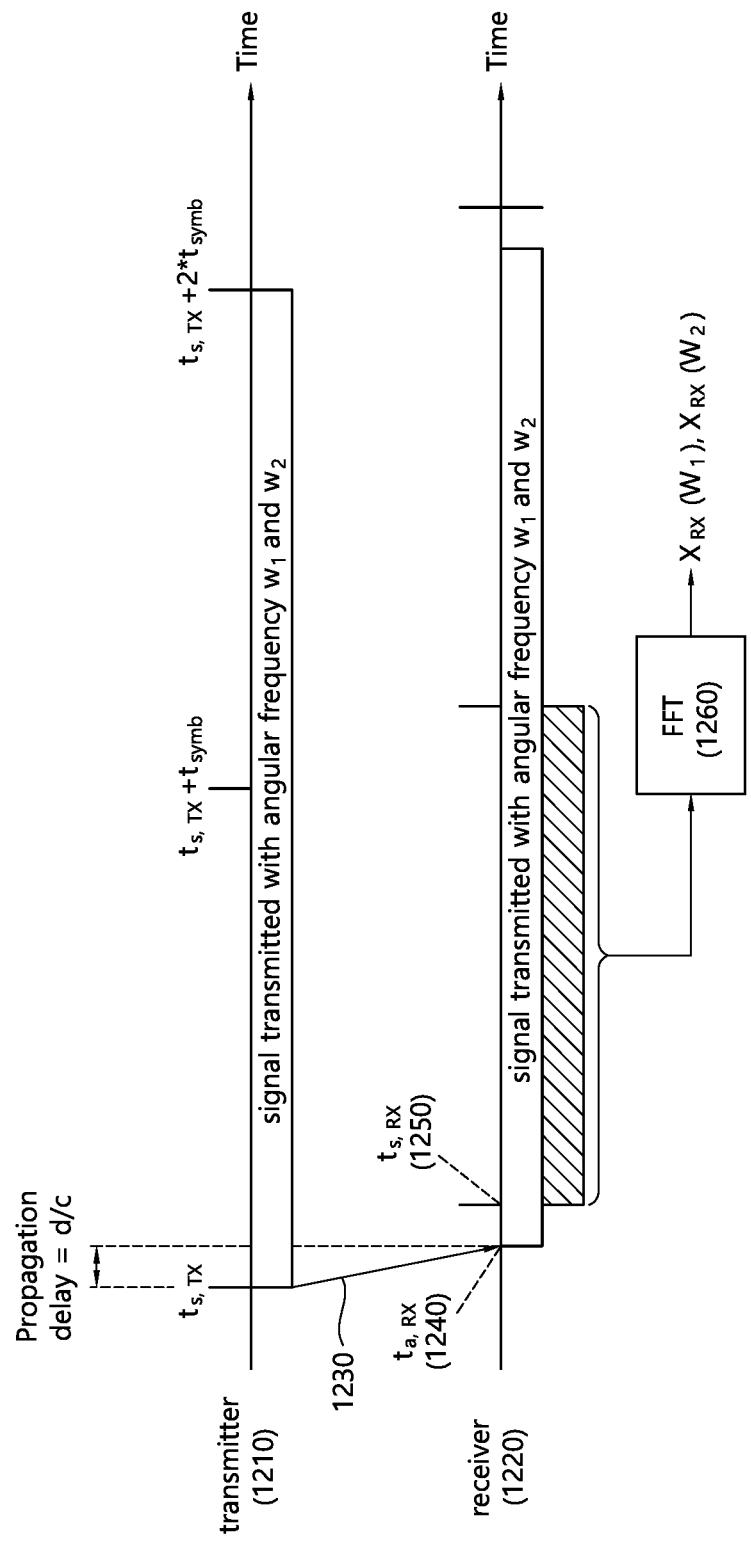
FIG. 12 is a diagram illustrating operations in a transmitter and a receiver.

FIG. 12 is a diagram illustrating operations in a transmitter and a receiver. The transmitter is a device for transmitting a transmission signal for distance measurement, and the receiver is a device which receives the corresponding transmission signal, processes the received transmission signal, and then transmits the reception signal generated by the receiver, to the transmitter. An example of FIG. 12 relates to a technique by which a transmitter measures a distance between the transmitter and a receiver via the reception signal.

In the example described below, it is assumed that a time point at which a transmitter and a receiver perform signal transmission and reception operations is quantized. For example, when transmitting and receiving a signal based on OFDM, the boundary point of each OFDM symbol is a quantized time point for performing transmission and reception operations. For convenience, it is assumed that the start time of the transmitting and receiving operations of the transmitter and the receiver starts from $t_{s,TX}$ and $t_{s,RX}$, respectively, and it is assumed that they appear repeatedly for each $t_{symb}$. In the case of OFDM, $t_{symb}$ may be the length of an OFDM symbol.

The transmitter is located at x=0 and transmits the distance measurement signal (i.e., transmission signal) through two frequencies w1 and w2 at $t=t_{s,TX}$. In this case, the initial phases of the two frequency components of the transmission signal may be set to be the same or may be set to be different from each other by a preset amount. Hereinafter, an example in which the initial phases are the same will be described for convenience of description. In this case, the transmission signal observed at the location of the transmitter is then shown below.

$$E(w_1, t, x=0) = A(0)*\exp(j*(w_1*(t-t_{s,TX})+\phi)),$$

$$E(w_2, t, x=0) = A(0)*\exp(j*(w_2*(t-t_{s,TX})+\phi)) \quad \text{[Equation 2]}$$

It is assumed that the receiver is placed away from the transmitter by d. The signal transmitted by the transmitter at $t=t_{s,TX}$ arrives at the receiver at $t=t_{a,RX}=t_{s,TX}+d/c$. The signal observed by the receiver is shown below.

$$E(w_1, t, x=d) = A(d)*\exp(j*(w_1*(t-w_1*t_{s,TX}-k_1*d+\phi)),$$

$$E(w_2, t, x=d) = A(d)*\exp(j*(w_2*(t-w_2*t_{s,TX}-k_2*d+\phi)) \quad \text{[Equation 3]}$$

As previously assumed, it is assumed that the point in time at which the receiver can actually start to process the transmission signal (for example, the OFDM processing point in the receiver) is quantized and the above signal is processed at $t=t_{s,RX}$. In the example of FIG. 12, it is assumed that OFDM processing using fast Fourier transform (FFT) is performed. The form of multiplying sinusoidal signals of various frequencies appearing as multiples of the fundamental frequency with initial phase=0 at $t=t_{s,RX}$, and adding the result values is shown. In this case, it is remained only when the sinusoidal signal of the same frequency as the frequency of the reception signal is multiplied due to the property of the FFT, and in the case that it is multiplied with other frequencies, it becomes 0 in the summing-up process. According to the attributes of the FFT operation/process as described above, the value $X_{RX}(w_1)$ obtained by the receiver for the frequency w1 component as the FFT result is expressed by the following equation.

$$X_{RX}(w_1) = E(w_1, t, x=d) * \exp(-j*w_1(t-t_{s,RX})) = \quad \text{[Equation 4]}$$
$$A(d) * \exp(j*(w_1*t - w_1*t_{s,TX} -$$
$$k_1*d - w_1*t + w_1*t_{s,RX} + \phi)) =$$
$$A(d) * \exp(j*(w_1*t_{s,RX} - w_1*t_{s,TX} - k_1*d + \phi)) =$$
$$A(d) * \exp(j*(w_1(t_{s,RX} - t_{a,RX}) + \phi))$$

The above-described FFT operation/process is equally applied to the frequency w2 component, and the resulting value $X_{RX}(w_2)$ is expressed as follows.

$$X_{RX}(w_2) = A(d)*\exp(j*(w_2(t_{s,RX}-t_{a,RX})+\phi)) \quad \text{[Equation 5]}$$

The receiver may compare the two values ($X_{RX}(w_1)$, $X_{RX}(w_2)$) obtained through the above equation as follows.

$$\frac{X_{RX}(w_2)}{X_{RX}(w_1)} = \exp(j*(w_2-w_1)(t_{s,RX}-t_{a,RX})) \quad \text{[Equation 6]}$$

Since the frequencies w1 and w2 of the transmission signal are known to the transmitter and the receiver, the receiver can calculate $t_{s,RX}-t_{a,RX}$ through Equation 6. Herein, $t_{s,RX}$ indicates a time point when the distance measurement signal is actually received by the receiver, and $t_{a,RX}$ indicates a time point of the OFDM processing by the receiver. As a result, the receiver may calculate a difference between the time point at which OFDM processing is started and the time point at which the actual signal reaches the receiver.

Through this, even if the receiver performs OFDM processing only at a specific quantized time point, the receiver may calculate the time when the signal transmitted by the specific transmitter actually arrives through appropriate phase calculation. In particular, this part is helpful when several devices transmit signals using different frequencies. Even if the receiver performs only a single FFT operation on the signal in which all signals overlap at a specific quantized point in time, the receiver may recognize a time point when an individual signal is received through subsequent simple phase calculations. In order for a receiver to recognize a time point of receiving an individual signal without using such an improve technique, very complex calculations and signal processing are required because it is necessary to determine whether a particular signal has arrived at each time point in the time dimension (for example, whether the value that correlates the expected signal with the actual signal is above a certain level).

The technical features described above will be described below with reference to FIG. 12.

The example of FIG. 12 may be used for distance measurement in a wireless communication system including a transmitter and a receiver that process signals in symbol units. In the example of FIG. 12, a symbol is a unit including conventional OFDM, OFDMA, and SC-FDMA symbols, and means a time unit for transmitting/receiving a radio signal. In FIG. 12, as described above, the transmitter 1210 is a device for transmitting a transmission signal 1230 for distance measurement, and a receiver 1220 is a device that receives and processes a signal (that is, a transmission signal) transmitted by the transmitter 1210.

As described above, the transmitter 1210 may transmit the transmission signal 1230 through a preset first frequency and a preset second frequency (e.g., w1, w2). That is, the transmission signal 1230 may include a first transmission component for the first frequency w1 and may include a second transmission component for the second frequency w2. The transmission signal 1230 including the second transmission component may be represented by Equation 2 and/or Equation 3 above.

The transmission signal 1230 arrives at the receiver 1220 at a "reception time point 1240," which is represented by $t_{a,RX}$ in the above-described example. Since the receiver 1220 processes the transmission signal 1230 (e.g., processes OFDM) in units of symbols, the actual processing for the corresponding signal starts at the processing point 1250. The processing time point 1250 is represented by $t=t_{s,RX}$ in the above-described example.

The receiver 1220 may calculate $X_{RX}(w_1)$ as shown in Equation 4 through the FFT operation 1260 for the first transmission component, and may calculate $X_{RX}(w_2)$ as shown in Equation 5 through the FFT operation 1260 for the second transmission component. As a result, the receiver 1220 may compare two different FFT calculation values (for example, by applying Equation 6), to thereby calculate the difference between the processing time point 1250 and the reception time point 1240 in the receiver 1220.

Meanwhile, the first frequency w1 and the second frequency w2 may be determined in consideration of various situations. As described in Equation 6, since the difference between the first frequency w1 and the second frequency w2 may be calculated by multiplying the difference between the processing time point 1250 and the receiving time point 1240, when the difference between the first frequency w1 and the second frequency w2 is set to be large, the difference between the processing time point 1250 and the reception time point 1240 may be easily obtained in the receiver 1220. That is, on the condition that the difference between the first frequency and second frequency is large, even when the difference between the processing time point 1250 and the reception time point 1240 is small, the final result value of Equation 6 becomes large, so that a small difference can be easily found. However, when the difference between frequencies increases, errors may occur in the calculation due to the frequency selective characteristic of the channel. Accordingly, the difference between the preset frequencies may be fixed but may be adaptively determined in consideration of channel characteristics. For example, at the transmitter 1210, the receiver 1220, and/or a third entity, a set of possible frequencies may be signaled in advance, and then indication information about the frequency to be actually used may be signaled or information about the channel characteristics may be signaled to thereby indicate the frequency to be actually used.

On the other hand, as shown in Equation 6, the operation value in the receiver 1220 is calculated in the form of a phase. Accordingly, there may be a problem in that the case where the value of $(w_2-w_1)(t_{s,RX}-t_{a,RX})$ exceeds the range of 360 degrees is not distinguished from the case where it is not. However, since the difference between the processing time point 1250 and the reception time point 1240 in the actual channel environment may be shorter than the symbol length, the above-described problem will not be a big problem in the actual system implementation.

Through the above-described operation, the receiver 1220 may obtain information about a difference between the processing time point 1250 and the reception time point 1240. Hereinafter, two detailed examples of measuring the distance to the transmitter 1210 using the calculated information are proposed.

<Measuring Scheme 1>

It is possible for the receiver 1220 to separately signal a difference (i.e., $t_{s,RX}-t_{a,RX}$) between the processing time point 1250 and the reception time point 1240. For example, the information (that is, the information about the difference in viewpoints) may be appropriately quantized, and then the quantized result may be formed into a series of bit strings, and the data having the generated bit strings as information may be transmitted to the transmitter 1210. In addition, the receiver 1220 transmits its distance measurement signal (processed as a reception signal on the part of the transmitter). In this case, the same frequency as the frequency used by the transmitter may be used as the distance measurement signal transmitted by the receiver, but different frequencies may be used.

As a specific example, in this case, the receiver 1220 may transmit a signal in the same form as the transmitter 1210 by using the first and second frequencies w1 and w2 at a time point $t=t_{s,RX}+n*t_{symb}$. This means that it transmits at the n-th quantized time point (e.g., the n-th OFDM symbol), and this n value may be a predetermined value. This signal (that is, a reception signal transmitted from the receiver to the transmitter) arrives at the transmitter at the time $t=t_{a,TX}=t_{s,RX}+n*t_{symb}+d/c$. Since $t_{s,TX}<t_{s,RX}$ is assumed above, the transmitter 1210 performs OFDM processing on the reception signal at a time point $t=t_{s,TX}+(n+1)*t_{symb}$.

In this case, the transmitter 1210 may perform an FFT operation on the first/second frequency to calculate a value corresponding to Equations 5 and 6 above. That is, the difference between the processing time $(t_{s,TX}+(n+1)*t_{symb})$ and the receiving time $t_{a,TX}$ in the transmitter 1210 can be calculated. That is, the transmitter 1210 may acquire the information $t_{s,TX}+(n+1)*t_{symb}-t_{a,TX}$. If the corresponding value is obtained, it is possible to obtain the distance d from the transmitter 1210 according to Equation 7 below. This is because $t_{symb}$ is a value already known to both the transmitter and the receiver. Equation 7 is obtained by adding information $t_{s,TX}+(n+1)*t_{symb}-t_{a,TX}$ obtained by the transmitter to $t_{s,RX}-t_{a,RX}$ which is separately signaled by the receiver.

$$t_{s,RX}-t_{a,RX}+t_{s,TX}+(n+1)*t_{symb}-t_{a,TX}=t_{s,RX}-t_{s,TX}-d/c+t_{s,TX}+t_{symb}-t_{s,RX}-d/c=t_{symb}-2d/c \quad \text{[Equation 7]}$$

<Measuring Scheme 2>

The measuring scheme 1 is an example of transmitting the processing time point 1250 and the reception time point 1240 through separate signaling in the receiver 1220. In contrast, the following example is an example of generating the same effect as a separate signaling by applying the phase difference to the distance measurement signal (e.g., reception signal) which is transmitted from the receiver 1220 to the transmitter 1210) without separately signaling the difference between the processing time point 1250 and the reception time point 1240. That is, it is possible to reflect the information $t_{s,RX}-t_{a,RX}$ obtained by the receiver 1220 on the phase difference between two frequency components (i.e., w1 and w2) used for its distance measurement signal (i.e., the reception signal).

In detail, the receiver 1220 sets the phases of the two frequency components (i.e., w1 and w2) in the distance measurement signal (i.e., the reception signal) transmitted by the receiver 1220 itself to become different by the following values.

$$B = \arg\left(\frac{X_{RX}(w_2)}{X_{RX}(w_1)}\right) = \quad \text{[Equation 8]}$$
$$(w_2 - w_1)(t_{s,RX} - t_{a,RX}) = (w_2 - w_1)(t_{s,RX} - t_{s,TX} - d/c)$$

In this case, when the position of the receiver 1220 is regarded as x=0, the signal may be shown as follows.

$$R(w_1,t,x=0)=A(0)*\exp(j*(w_1*(t-t_{s,RX}-n*t_{symb})+\phi))$$

$$R(w_2,t,x=0)=A(0)*\exp(j*(w_2*(t-t_{s,RX}-n*t_{symb})+B+\phi)) \quad \text{[Equation 9]}$$

The signal arriving at the transmitter 1210 at distance d from the receiver 1220 is as follows. The time point at which this signal arrives at the transmitter is $t=t_{a,TX}=t_{s,RX}\pm n*t_{symb}+d/c$.

$$R(w_1,t,x=d)=A(d)*\exp(j*(w_1*t-w_1*t_{s,RX}-w_1*n-t_{symb}-k_1*d+\phi)),$$

$$R(w_2,t,x=d)=A(d)*\exp(j*(w_2*t-w_2*t_{s,RX}-w_2*n*t_{symb}-k_2*d+B+\phi))$$ [Equation 10]

The transmitter 1210 performs the FFT operation by multiplying the sinusoidal signal of initial phase 0 at $t=t_{s,TX}+(n+1)*t_{symb}$, which is also a quantized processing time point. The component w1 obtained at this time is as follows.

$$X_{TX}(w_1) =$$ [Equation 11]

$$R(w_1, t, x = d)*\exp(-j*w_1(t - t_{s,TX} - (n+1)*t_{symb})) =$$

$$A(d)*\exp(j*(w_1(t_{s,TX} - t_{s,RX} + t_{symb} - d/c) + \phi))$$

In the same manner, the w2 component can be calculated as follows.

$$X_{TX}(w_2)=A(d)*\exp(j*(w_2(t_{s,TX}-t_{s,RX}+t_{symb}-d/c)+B+\phi))$$ [Equation 12]

When the FFT result value calculated through Equation 11/12 is compared as follows, the distance d between the transmitter 1210 and the receiver 1220 may be measured.

$$\frac{X_{TX}(w_2)}{X_{TX}(w_1)} =$$ [Equation 13]

$$\frac{\exp(j*(w_2(t_{s,TX} - t_{s,RX} + t_{symb} - d/c) + B + \phi))}{\exp(j*(w_1(t_{s,TX} - t_{s,RX} + t_{symb} - d/c) + \phi))} =$$

$$\exp(j*((w_2 - w_1)(t_{s,TX} - t_{s,RX} + t_{symb} - d/c) +$$

$$(w_2 - w_1)(t_{s,RX} - t_{s,TX} - d/c))) =$$

$$\exp(j*(w_2 - w_1)(t_{symb} - 2d/c))$$

The above-described equations are merely an example of applying the technique according to the present specification in a specific environment, and the content of the present specification is not limited to the above-described equations. An example of the present specification, for example, the measuring scheme 2 may be described in another format as follows.

The transmitter 1210 receives a reception signal from the receiver 1220. The reception signal includes a first reception component for the first frequency (i.e., w1) and a second reception component for the second frequency (i.e., w2). In addition, a phase difference set by the receiver may be applied between the phase of the first reception component and the phase of the second reception component. The phase difference is set based on a difference (for example, $t_{s,RX}-t_{a,RX}$) between the processing time point 1250 and the reception time point 1240 calculated by the receiver 1220 through the transmission signal 1230. The phase difference is also set based on the difference between the first frequency and the second frequency (i.e., w2−w1). An example of such a phase difference may be expressed by Equation 8 above.

The transmitter 1210 processes signal processing (e.g., OFDM processing) at a quantized time point with respect to a reception signal to which a phase difference is applied. That is, the reception signal may be received at $t_{a,TX}$ and processed at $t_{s,TX}$. When the FFT operation is performed on the first frequency component and the second frequency component of the reception signal, a corresponding FFT value may be calculated, and examples of such FFT values are as shown in Equations 11 and 12. The transmitter 1210 may calculate the final distance d by comparing the calculated FFT value.

The above-described measuring method 1 and measuring method 2 has the following advantages and disadvantages. First, the measuring scheme 1 is not limited to the usage in the transmitter 1210 specified by the distance measurement signal (i.e., the reception signal) transmitted by the receiver 1220 because in the signal itself, the receiver 1220 generates two frequency components with the same phase without any restriction. Accordingly, this signal can be received by various transmitters and used for distance calculation. In this case, the receiver 1220 should transmit information $t_{s,RX}-t_{a,RX}$ obtained for the distance measurement signal of each transmitter to each transmitter.

Measuring scheme 2 has the advantage that the receiver 1220 can include the necessary information therein while transmitting a distance measurement signal (i.e., a reception signal) without separate information transmission, but since the distance measurement signal corresponding to the individual transmitter needs to be transmitted, the number of times of transmission of the distance measurement signal may increase.

The assumptions applied in explaining the principles described above may vary depending on the specific signal design (for example, whether or not the cyclic prefix is used in the OFDM signal and its length) or the synchronization scheme between the transmitter and the receiver, but applying the same principle to measure the distance is also possible.

The aforementioned distance measuring scheme can be used to measure the distance between different entities (e.g., a vehicle and/or an UE). That is, the distance between each other can be measured in a manner that different entities exchange transmission signals and reception signals. In addition, the schemes described above can also be used to measure direction, position, etc. between wireless communication systems. For example, a particular entity on the network (e.g., a vehicle and/or a UE) may measure the distance from another entity (e.g., a base station) of which the location is already known, and it is also possible to know its own exact absolute position.

The above-described distance measurement techniques can be initiated under specific conditions. For example, when the information value according to another positioning technique such as GPS exceeds a preset threshold value, the measuring scheme may be started. Further, the above-described measuring scheme may be started even when a precondition according to a communication standard such as 3GPP is satisfied. In addition, the above distance measuring scheme may be used in combination with an additional example described below. Possible examples are further described below.

Hereinafter, a method of measuring a distance between entities (e.g., vehicles) using a plurality of antenna groups and a beam forming scheme is proposed. It is possible to use the example of FIG. 12 in the process of measuring the distance between respective entities, and further refined distance measurement is possible through the proposed "antenna group and beam information".

Specifically, the following example may solve a problem that may occur when a large device such as an automobile measures a distance between each other through transmission and reception of a wireless signal, but the present disclosure is not limited to this example. In addition, the following example proposes an effective method in a situation of using a part of the antenna or beamforming when transmitting and receiving a radio signal used for distance measurement using a plurality of transmit and receive antennas.

Figure 13:
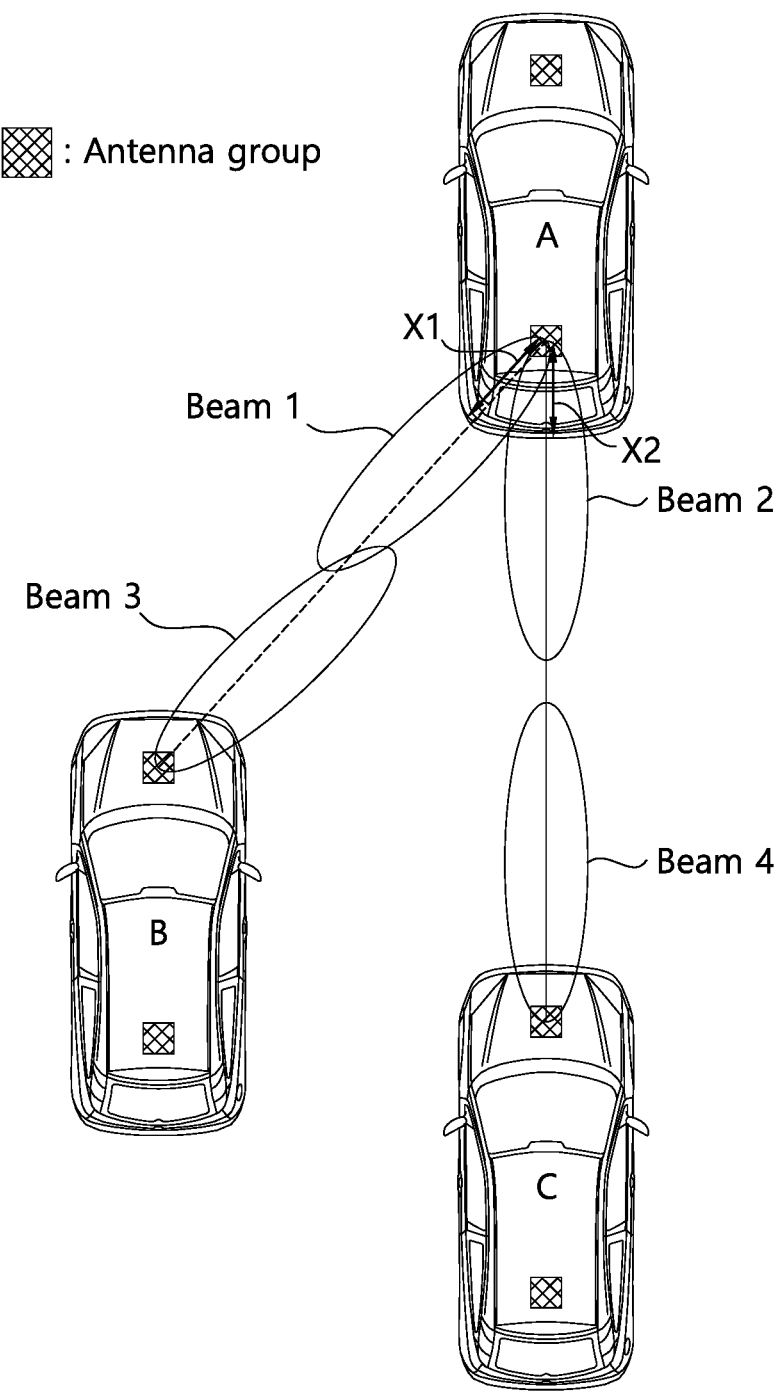
FIG. 13 illustrates a situation in which an example of the present specification may be applied.

FIG. 13 illustrates a situation in which an example of the present specification may be applied. The example of FIG. 13 is an example related to a vehicle, but as described above, examples of the present specification are not limited to the vehicle.

As shown, two antenna groups may be installed in a vehicle. By distributing a plurality of antenna groups in one vehicle, it is possible to solve the problem that the radio signal is blocked in the vehicle body. That is, one antenna group does not need to receive signals in all directions and transmit signals in all directions.

As illustrated, it is assumed that each antenna group is composed of a plurality of antenna elements and can perform beamforming to amplify a transmission/reception signal in a specific direction. FIG. 13 shows a case that the vehicle A transmits a distance measurement signal using an antenna group (for example, a first antenna group) installed at the rear side and uses beam 1 and beam 2, respectively. Vehicles B and C receive the signal of vehicle A by using the antenna group installed in front, and using beam 3 and beam 4, respectively. Although not specifically illustrated in FIG. 13, an antenna group (e.g., a second antenna group) installed in front of the vehicle A may also configure a plurality of transmission beams. It is also possible to communicate with either vehicle B or vehicle C via the transmission beam of this second antenna group.

Hereinafter, a specific example of "antenna group and beam information" is proposed. The antenna group and the beam information mean various pieces of information that are additionally necessary for a situation of measuring a distance between entities (vehicles). The antenna group and beam information may be signaled in advance or signaled in a distance measuring process between vehicles as in the following example.

The antenna group and beam information may include various information. For example, it may include at least one of 1) information about antenna-vehicle body distance, 2) information about radio resources (e.g., time/frequency/code resources) used for the transmission beam (e.g., the beam for transmitting the distance measurement signal), 3) information about a sequence (e.g., a bit sequence) used for a transmission beam (e.g., a beam for transmitting a distance measurement signal), 4) information about characteristics (e.g. antenna gain, direction, power) regarding the transmission beam, and 5) reference information used to generate a signal in a receiving vehicle (e.g., a mapping relationship between a transmitting beam in a transmitting vehicle and a receiving beam in a receiving vehicle, and a threshold power value for selecting a signal to be processed when a plurality of signals are received by the receiving vehicle). In addition, the information about the antenna-vehicle body distance may include all examples of various information related to the antenna and/or the vehicle body. For example, the information may include information about the relative position of the antenna from a particular reference point of the vehicle. In this case, the reference point may be, for example, the leftmost front point of the vehicle. In addition, the information may include information on the size (length, width, and/or height) of the vehicle as an example of the information about the vehicle. In addition, the information may include index and/or location information of the antenna group participating in the actual transmission.

The antenna group and the information elements included in the information may have a mapping relationship with each other. In addition, information on such a mapping relationship may also be indicated by one information element in the antenna group and beam information. For example, a particular antenna-body distance can be mapped to a particular radio resource and/or sequence or the like. Accordingly, the receiving entity (vehicle) that has obtained the antenna group and the information in advance may determine what antenna-vehicle body distance information should be used when a distance-specific signal is received through a specific resource/sequence or the like.

In view of the fact that a large number of specific entities (vehicles) travel in a large area, it is not desirable to exclusively allocate information such as specific resources/sequences for distance measurement between respective entities, and it is not desirable to fixedly determine the above-described mapping relationship. That is, it is preferable that the entity decides itself or dynamically determines a specific resource/sequence and the like in a manner that is scheduled through a higher entity (e.g., a base station) and dynamically determines a mapping relationship between respective information elements. However, the distance measurement between entities need be repeated in very short periods, whereas the information according to the antenna group and beam information need not be repeated in short periods. In consideration of this point, the following example is proposed.

An example of the antenna group and the beam information including the information on the antenna-vehicle body distance will be described below.

In measuring the distance between vehicles, the information that is really important may be the distance between the vehicle bodies. However, the distance obtained by the signal transmission through the antenna is a distance between the antennas, which does not correspond to the distance between the vehicle bodies, and this problem may be increased especially when the accuracy of measurement of position between vehicles is required to be 1 m or less. Also, as shown in FIG. 13, if a plurality of antenna groups are installed in different positions in a vehicle and the beam used varies according to the situation, the distance between the antenna and the vehicle body also varies according to the beam. Specifically, in FIG. 13, when the vehicle A transmits the distance measurement signal through the beam 1, the distance between the antenna and the vehicle body is approximately X1, but when the vehicle A transmits the distance measurement signal through the beam 2, the distance between the antenna and the vehicle body is approximately X2, and the condition X1>X2 is established.

In the above situation, for more accurate distance measurement, it is preferable that the antenna group and beam information including the information on the antenna-vehicle body distance are signaled.

First, each vehicle may operate so that the distance measurement signals transmitted through different antenna groups and/or different beams may be transmitted using different time/frequency resources, or may use different sequences, to thereby allow mutual distinction. In this process, information on time/frequency/sequence and the like is mapped to information on the antenna-vehicle body distance, and information on the mapping relationship is preferably included in the above-described antenna group and beam information.

For example, in the example of FIG. 13, the distance measurement signal transmitted through the beam 1 and the distance measurement signal transmitted through the beam 2 in the first antenna group may be divided in time/frequency resources or sequences used. Each vehicle may inform the neighbor vehicles of information on the distance between the antenna and the vehicle in the advancing direction of the distance measurement transmission signal defined as a specific time/frequency resource or sequence, in the form of the above-described antenna group and beam information.

Information on the antenna group and beam information (e.g., information about the antenna-vehicle body distance) can be dynamically changed, so that it can be conveyed to surrounding vehicles in advance through relatively long periods of inter-vehicle messages. When each neighbor vehicle receives a distance measurement signal through a specific time/frequency/sequence, each neighbor vehicle may determine the distance between the antenna and the vehicle body in the transmitting vehicle in the corresponding direction based on the corresponding information.

Figure 14:
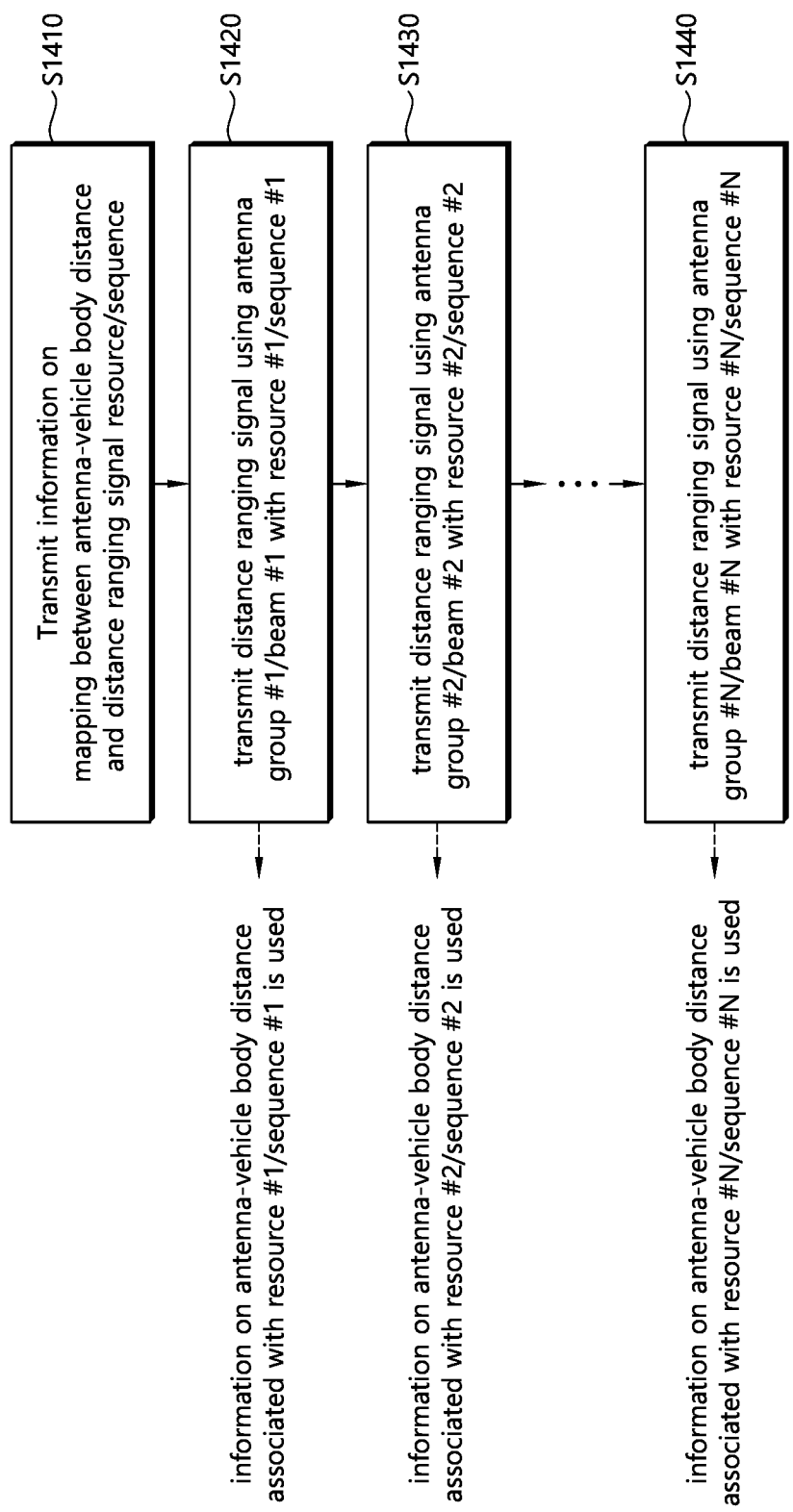
FIG. 14 illustrates an example of first transmitting antenna group and beam information, and then measuring distance between vehicles through a distance measurement signal.

FIG. 14 illustrates an example of first transmitting antenna group and beam information, and then measuring distance between vehicles through a distance measurement signal. As shown, information about the antenna-vehicle body distance and information about the mapping between the distance measurement signals are transmitted first. Thereafter, the vehicle receiving the distance measurement signal may obtain information about the corresponding antenna-vehicle body distance through the time/frequency/sequence in which the distance measurement signal is used. FIG. 14 illustrates an example related to a situation in which information on antenna-vehicle body distance is mapped to information on the mapping, but the mapping relationship between the antenna group and the individual information elements included in the beam information may be variously set.

Figure 15:
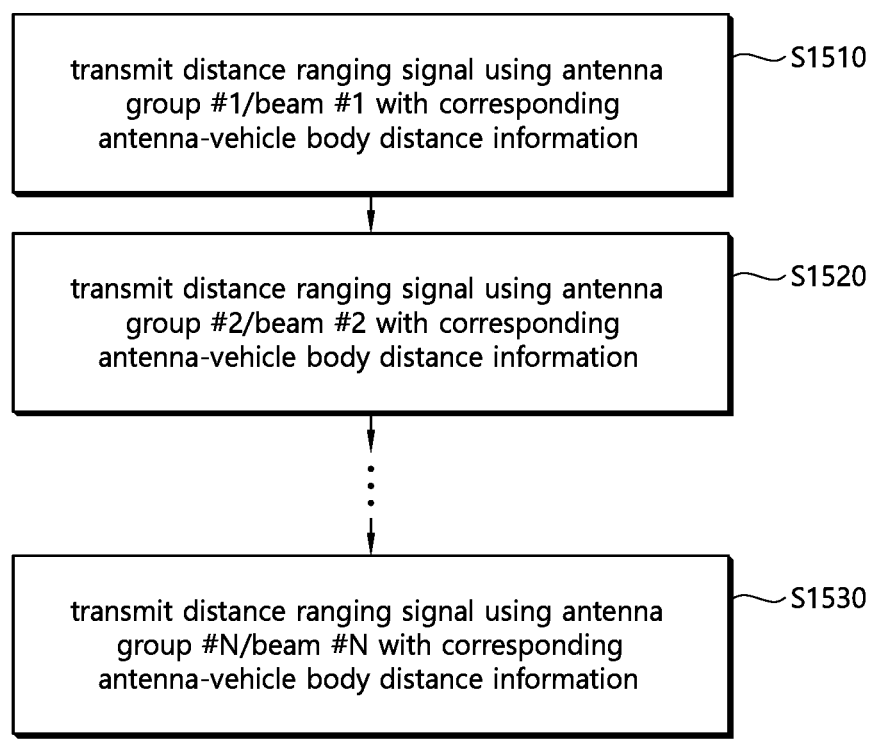
FIG. 15 shows a modified example of FIG. 14.

FIG. 15 shows a modified example of FIG. 14. According to FIG. 15, the vehicle may transmit information on the antenna-vehicle body distance in consideration of the antenna group and the transmission beam used for the transmission while transmitting the distance measurement signal. In the example of FIG. 15, the mapping between the information on the antenna-vehicle body distance and the time/frequency/sequence may not be applied. In other words, it is not necessary to use an associated time/frequency/sequence to transmit a distance measurement signal using a specific antenna group and beam, and it is possible to change time/frequency/sequence dynamically.

Figure 16:
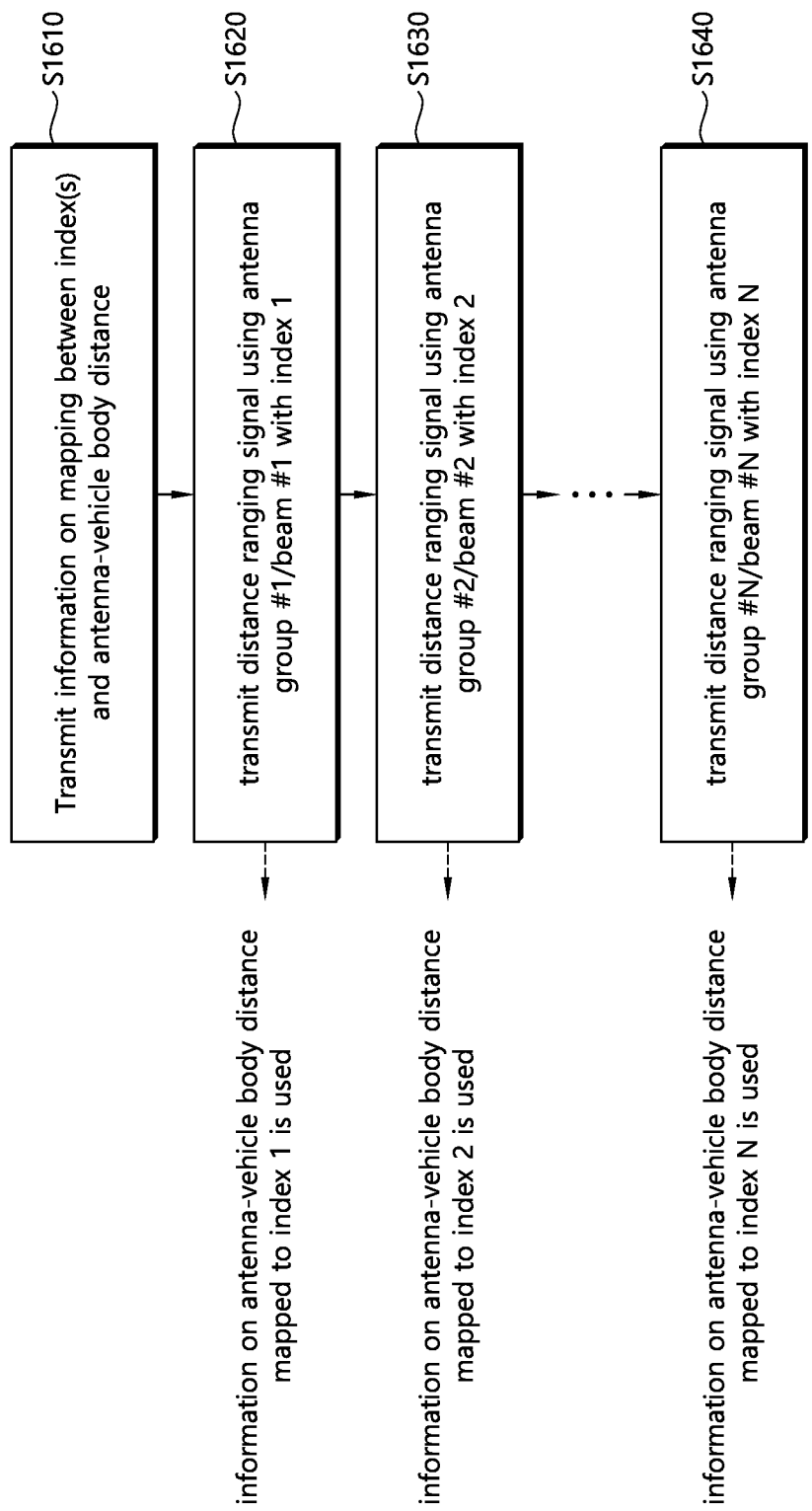
FIG. 16 shows a modified example of FIG. 14.

FIG. 16 shows a modified example of FIG. 14. According to FIG. 16, it is possible to link an index specified in advance to all or a part of information included in the antenna group and the beam information, and transmit the index together at each time when the distance measurement signal is transmitted.

As another example, when the transmission vehicle uses a specific beam, the transmission timing of the distance measurement signal may be adjusted according to the distance between the antenna and the vehicle body corresponding thereto. For example, referring to FIG. 13, when the vehicle A transmits to beam 1, the distance measurement signal is transmitted at a point in time ahead of the time required for the signal to travel by the distance X1 based on a predetermined point in time, but in the case of transmission to beam 2, the distance measurement signal may be transmitted at a point in time preceding the time required for the signal to progress by the distance X2. In this case, the receiving vehicle always seems to start transmitting the distance measurement signal at the edge of the vehicle body at a predetermined point of time, thereby solving the problem that the distance between the antenna and the vehicle body is different for each antenna group and/or beam without additional signaling. On the other hand, as described above, the information on the antenna-vehicle body distance may include information about the relative position of the antenna from a specific reference point of the vehicle. In this case, the adjustment of the transmission time point of the distance measurement signal (first distance measurement signal) may be determined in consideration of the reference point. That is, the transmission time point can be adjusted so that the transmission in each antenna provided in the vehicle appears to be transmitted from a reference point. In detail, the transmission may be performed by delaying the time it takes for the signal transmitted from the reference point to reach the corresponding antenna.

The receiving vehicle, which has received the distance measurement signal from the transmitting vehicle, also determines the distance between the antenna and the vehicle body in consideration of the antenna group which received the signal and the beam used for the reception. The distance between the vehicle bodies may be finally measured by using the distance between the antennas obtained through the above process and the antenna-body distance information of the transmitting vehicle.

The operations described with reference to FIGS. 13 to 16 may be applied even in a situation in which distance measurement between antennas is possible as soon as a signal transmitted by a transmitting vehicle is received. That is, the examples of FIGS. 13 to 16 may be applied when a transmitting/receiving vehicle is connected to a satellite and mutual synchronization is well established, and accordingly, the distance between antennas is measured based on the time spent until a signal transmitted at a predetermined time is received. However, if mutual synchronization is not maintained, the receiving vehicle does not know when the distance measurement signal was transmitted and accordingly the receiving vehicle may retransmit the regression signal at its reception time or a predetermined specific time point derived therefrom, and the transmitting vehicle may measure the distance by calculating a round trip time between two vehicles based on the arrival time of the regression signal.

Figure 17:
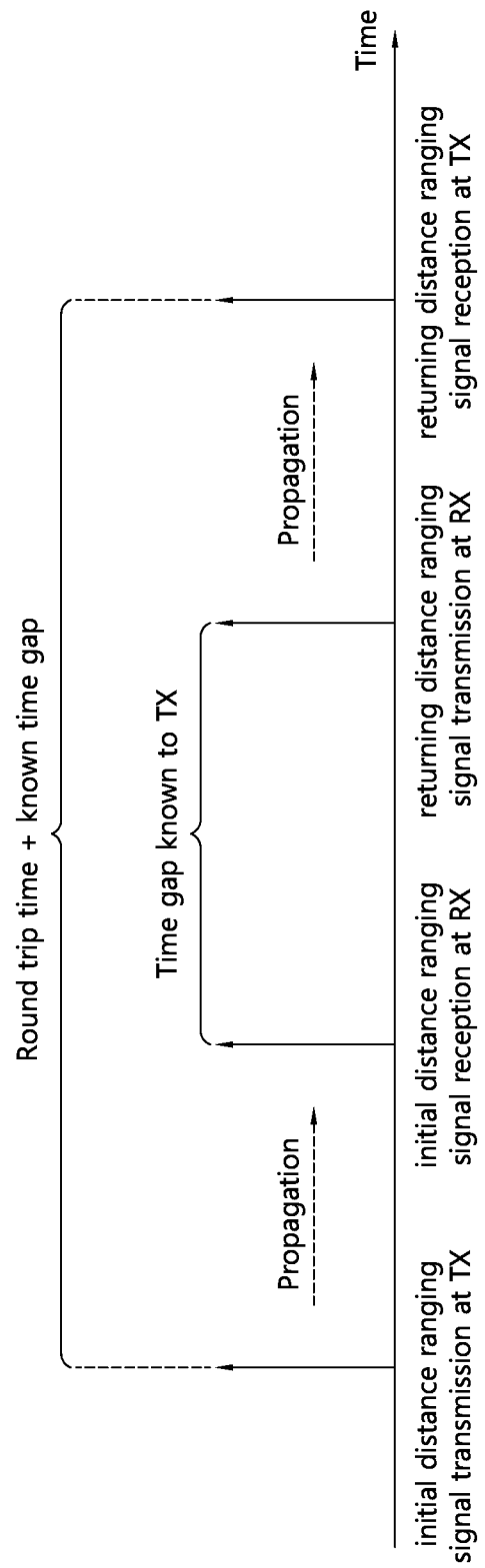
FIG. 17 illustrates an example of measuring a round trip time between two vehicles based on a regression signal transmitted from a receiving vehicle.

FIG. 17 illustrates an example of measuring a round trip time between two vehicles based on a regression signal transmitted from a receiving vehicle.

In this case, the receiving vehicle (a vehicle receiving the first distance measurement signal and transmitting a regression signal thereof) does not need to know information about the antenna-vehicle body distance from the transmitting vehicle (the vehicle transmitting the first distance measurement signal). This is because the final distance between vehicle bodies is calculated by the transmitting vehicle.

However, in order to for the transmitting vehicle to calculate this, information on the antenna group when the receiving vehicle transmits the regression signal and the antenna-vehicle body distance corresponding to the beam is required. To this end, information on antenna-vehicle body distance and mapping of time/frequency/sequence in the antenna group and beam information may be applied. When such mapping information is shared in advance, the receiving vehicle may use a time/frequency/sequence mapped to the antenna group/beam while transmitting a regression signal through the antenna group and the beam that received the initial signal. This example may be understood to be similar to the example of FIG. 14 described above.

Alternatively, antenna-vehicle body distance information corresponding to the antenna group and beam used for each regression signal transmission may be reported. This example may be understood to be similar to the example of FIG. 15 described above.

Alternatively, as described above, an index may be assigned to each antenna group and beam combination, and antenna-vehicle body distance information for each combination may be informed in advance, and then a corresponding index may be informed at every regression signal transmission. This example may be understood to be similar to the example of FIG. 16 described above.

Alternatively, when transmitting the regression signal, it is based on a specific point in time determined from the time of receipt of the first distance measurement signal, and the regression signal may be transmitted at a point in time that advances the distance between the antenna and the vehicle body corresponding to the antenna group and beam used for transmission, thereby exhibiting the effect as if the regression signal (not the end of the antenna) is transmitted at the end of the body.

Hereinafter, a method of selecting an antenna group and a beam for the above regression signal will be described.

When the receiving vehicle receives the initial distance measurement signal and transmits a regression signal thereto, the antenna group and the beam to be used for the regression signal transmission should be determined. Basically, when the receiving vehicle receives a specific initial distance measurement signal through a specific beam of a specific antenna group, the receiving vehicle may operate to transmit a corresponding regression signal using the same antenna group and beam. This allows the bidirectional link between the transmitting vehicle and the receiving vehicle to use the same antenna group and beam so that the round trip time can be accurately calculated.

Even when the transmitting vehicle transmits a specific initial distance measurement signal in one antenna group and beam combination, the receiving vehicle may receive the same signal through different beams or antenna groups. In this case, the receiving vehicle can transmit the regression signal by selecting the antenna group and the beam with the strongest signal, so that a single regression signal transmission can measure the distance on the path between the most dominant transmitting and receiving vehicles. Alternatively, the receiving vehicle uses a plurality of antenna groups and beams that receive a signal at a predetermined level or more, or are received at a predetermined ratio or more with respect to the strongest size signal, or are included within a predetermined number in a reception signal size order, to thereby transmit a regression signal. In this way, the transmitting vehicle can measure the distance for each of the multiple paths that can be formed between specific receiving vehicles, and by combining them properly, the final inter-vehicle distance can be more accurately calculated, or the future inter-vehicle distance can also be estimated by using the speed/direction information of the transmitting/receiving vehicle. At this time, the receiving vehicle transmits the regression signal together with information on the antenna group used to transmit the regression signal and the receiving intensity of the initial distance measurement signal received from the beam, and accordingly, a greater weight may be applied to the calculated values in the antenna group and the beam where the signal reception was strong when a transmitting vehicle combines round trip times based on each regression signal. This reception intensity information may be known through separate signaling (for example, may be signaled through the above-described antenna group and beam information), or may be indirectly measured by setting the power used by the receiving vehicle to transmit the regression signal to be proportional to the reception power of the corresponding initial distance measurement signal (signal transmitted from the transmitting vehicle).

If a case that the antenna group and the beam in which the receiving vehicle receives the initial distance measurement signal differ from the antenna group and the beam used for the regression signal correspondingly transmitted, the information thereabout should also be transmitted to the transmitting vehicle. This is possible by extending the information on the combination of the antenna group and the beam used as described above to a combination of information used to receive the first distance measurement signal at the receiving vehicle side and information used to transmit the regression signal. For example, as described above, when the information on the antenna group and the beam combination is transmitted based on the index, it may be used to refer to the use of one index for receiving the first distance measurement signal and the other for regression signal transmission while delivering two indexes. In particular, such a case may be utilized when a transmission capability and a reception capability do not match in a vehicle antenna implementation, and it may be utilized when, for example, in a specific antenna group, only reception is possible and transmission is not possible, or the number of antenna elements that can be simultaneously used for reception in a specific antenna group is different from the number that can be simultaneously used for transmission.

On the other hand, when the transmitting vehicle transmits the first distance measurement signal for itself using a plurality of antenna groups and beams, the receiving vehicle also receives the first distance measurement signal from the same transmitting vehicle through the plurality of antennas and beams. Even in this case, the regression signal may be transmitted based on the above-described scheme. For example, the regression signal may be transmitted once in accordance with the antenna group and the beam received with the strongest size. Alternatively, the regression signal may be transmitted several times in accordance with a plurality of antenna groups and beams meeting the conditions described in the above embodiments, and in this case, information on the received power of the first distance measurement signal may also be included.

Meanwhile, depending on the implementation of the antenna, antenna gains may be different between different antenna groups or between different beams formed in the same antenna group. For example, the gain between the main lobe and the sieve lobe may be different within one antenna group. In addition, the gain between different antenna groups may be different.

In this case, if the receiving vehicle attempts to make a distance measurement based on the magnitude of the received power or decides the antenna group and beam to transmit the regression signal, in practice, this may result in measuring the distance in a direction other than the strongest path on the channel path (for example, the path the signal travels through the line of sight without reflection or diffraction). To prevent this, information (e.g., the above-described antenna group and beam information) that is shared in advance or transmitted with the distance measurement signal may include antenna gain when transmitted through a specific antenna group and beam. The receiving vehicle may perform the above-described operation based on the corrected received power. Alternatively, the transmission power of the initial distance measurement signal and the regression signal can be adjusted in consideration of the difference in the antenna gain during transmission. For example, this transmit power regulation can be operated to allow the same power to always be sent in the direction the transmission is directed when transmitted through any antenna group and beam (that is, if the antenna gain of a specific antenna group/beam is low, the transmit power is increased by that amount, and if the antenna gain is high, the transmit power is decreased by that amount.).

Specific examples described above may be implemented through various devices. For example, it may be implemented by hardware, firmware, software, or a combination thereof.

Figure 18:
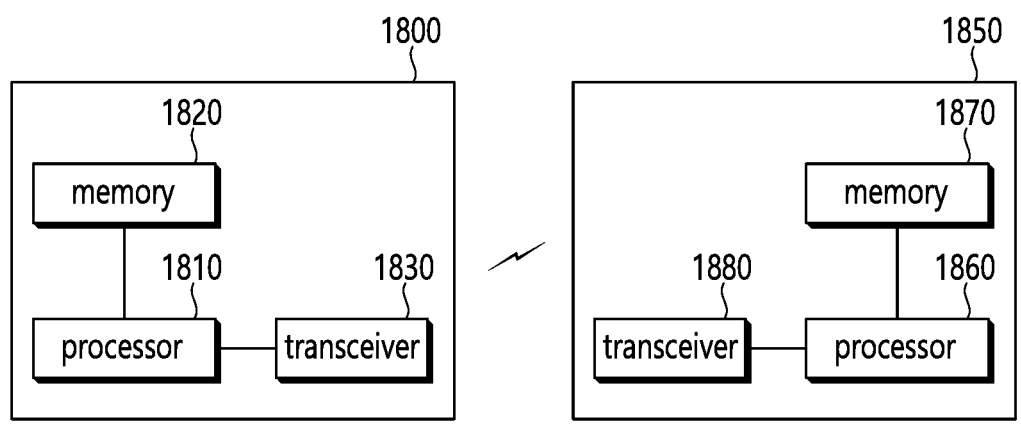
FIG. 18 is an example of an apparatus in which an example of the present specification is implemented.

FIG. 18 is an example of an apparatus in which an example of the present specification is implemented.

Referring to FIG. 18, a transmitter 1800 and a receiver 1850 may operate according to the above-described example.

The illustrated transmitter 1800 includes a processor 1810, a memory 1820, and a transceiver 1830. Similarly, the illustrated receiver 1850 includes a processor 1860, a memory 1870, and a transceiver 1880. The illustrated processor, memory, and transceiver may be implemented as separate chips, or at least two blocks/functions may be implemented through one chip.

The transceivers 1830 and 1880 perform transmission and reception of signals.

The processors 1810 and 1860 may implement the functions, processes, and/or methods proposed herein. The processors 1810 and 1860 may perform operations according to the above description. Such processors 1810 and 1860 may include application-specific integrated circuits (ASICs), other chipsets, logic circuits, and data processing devices.

The memories 1820 and 1870 may include read-only memory (ROM), random access memory (RAM), flash memory, memory vehicles, storage media, and/or other storage devices.

Figure 19:
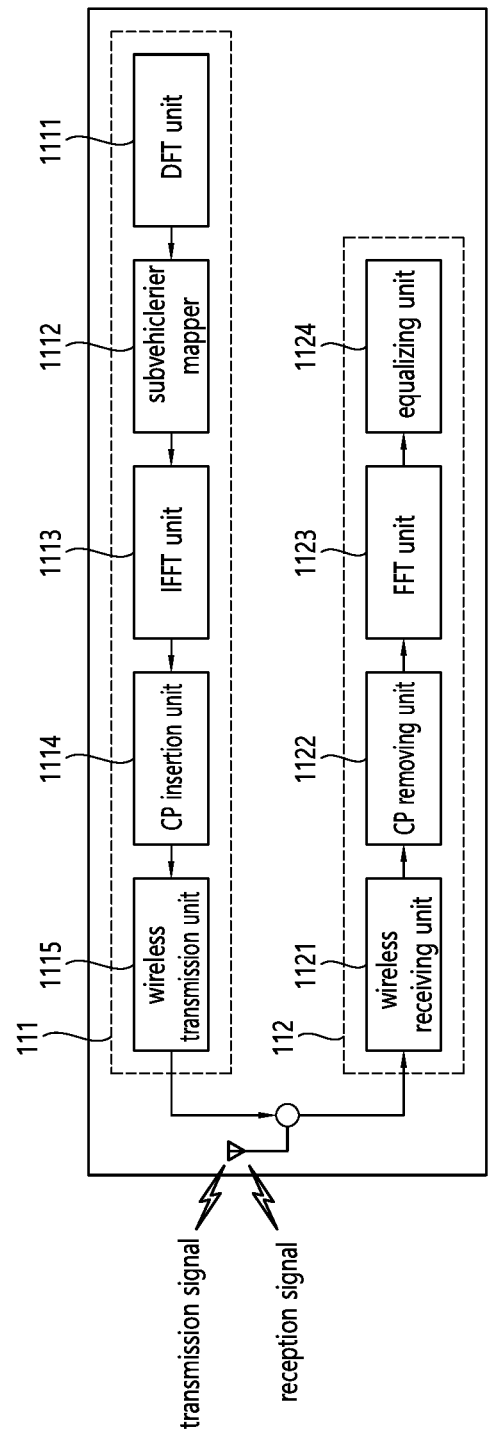
FIG. 19 is a detailed block diagram of a transceiver.

FIG. 19 is a detailed block diagram of a transceiver.

Referring to FIG. 19, a transceiver 110 includes a transmission part 111 and a reception part 112. The transmission part 111 includes a discrete Fourier transform (DFT) unit 1111, a subvehiclerier mapper 1112, an IFFT unit 1113, a CP insertion unit 1144, and a wireless transmission unit 1115. The transmission part 111 may further include a modulator. In addition, the transmission part 111 may further include a scramble unit (not shown), a modulation mapper (not shown), a layer mapper (not shown) and a layer permutator (not shown), which may be disposed before the DFT unit 1111. That is, in order to prevent an increase in peak-to-average power ratio (PAPR), the transmission part 111 first passes the information through the DFT 1111 before mapping a signal to a subvehiclerier. After subvehiclerier mapping of a signal spread by the DFT unit 1111 (or precoded in the same sense) through the subvehiclerier mapper 1112, it is again made into a signal on the time axis via the Inverse Fast Fourier Transform (IFFT) unit 1113.

The DFT unit 1111 outputs complex-valued symbols by performing a DFT on the inputted symbols. For example, when Ntx symbols are input (where Ntx is a natural number), the DFT size is Ntx. The DFT unit 1111 may be called a transform precoder. The subvehiclerier mapper 1112 maps the complex symbols to each subvehiclerier in the frequency domain. The complex symbols may be mapped to resource elements corresponding to resource blocks allocated for data transmission. The subvehiclerier mapper 1112 may be called a resource element mapper. The IFFT unit 1113 performs an IFFT on the inputted symbol and outputs a baseband signal for data, which is a time domain signal. The CP insertion unit 1114 copies a part of the rear part of the base band signal for data and inserts it in the front part of the base band signal for data. Inter-symbol interference (ISI) and inter-vehiclerier interference (ICI) can be prevented through CP insertion to maintain orthogonality even in multipath channels.

On the other hand, the receiving part 112 includes a wireless receiving unit 1121, a CP removing unit 1122, an FFT unit 1123, an equalizing unit 1124, and the like. The wireless receiving unit 1121, the CP removing unit 1122, and the FFT unit 1123 of the receiving part 112 perform the reverse functions of a wireless transmitting unit 1115, a CP inserting unit 1114, and an IFF unit 1113 at the transmission part 111. The receiving part 111 may further include a demodulator.

What is claimed is:

1. A method for measuring a distance between a first apparatus and a second apparatus for processing a signal in symbol units, in a wireless communication system including the first apparatus and the second apparatus, the method comprising:

transmitting, by the first apparatus, a transmission signal to the second apparatus through a preset first frequency and a preset second frequency;

receiving, by the first apparatus, a reception signal, from the second apparatus, in response to the transmission signal; and calculating, by the first apparatus, a distance between the first apparatus and the second apparatus based on a first reception component for the first frequency and a second reception component for the second frequency, wherein the reception signal includes the first reception component and the second reception component, wherein a phase difference, which is set by the second apparatus, is applied between a phase of the first reception component and a phase of the second reception component, wherein the phase difference is based on the product of a difference between a reception time point at which the transmission signal is received by the second apparatus and a processing time point at which the transmission signal is processed in the second apparatus and a difference between the first frequency and the second frequency, and wherein the symbol is an orthogonal frequency division multiplexing (OFDM) symbol, and the processing time point is a time point at which the second apparatus starts to perform an OFDM process.

2. The method of claim 1, wherein calculating the distance between the first apparatus and the second apparatus comprises:

performing a fast Fourier transform (FFT) operation for the first reception component and the second reception component.

3. The method of claim 1, wherein the transmission signal includes a first transmission component for the first frequency and a second transmission component for the second frequency, and a phase of the first transmission component and a phase of the second transmission component are the same.

4. The method of claim 1, wherein the first apparatus is configured to communicate with at least one of a mobile terminal, a network device, and/or an autonomous driving vehicle.

5. A first apparatus for processing a signal in symbol units in a wireless communication system, the first apparatus comprising:

a transceiver configured to transmit and receive a wireless signal; and a processor configured to control the transceiver, wherein the processor is configured to:

control the transceiver to allow the first apparatus to transmit a transmission signal to the second apparatus through a preset first frequency and a preset second frequency;

control the transceiver to allow the first apparatus to receive, from the second apparatus, a reception signal in response to the transmission signal; and calculate a distance between the first apparatus and the second apparatus based on a first reception component for the first frequency and a second reception component for the second frequency, wherein the reception signal includes the first reception component and the second reception component, wherein a phase difference, which is set by the second apparatus, is applied between a phase of the first reception component and a phase of the second reception component, wherein the phase difference is based on the product of a difference between a reception time point at which the transmission signal is received by the second apparatus and a processing time point at which the transmission signal is processed in the second apparatus and a difference between the first frequency and the second frequency, and wherein the symbol is an orthogonal frequency division multiplexing (OFDM) symbol, and the processing time point is a time point at which the second apparatus starts to perform an OFDM process.

6. The first apparatus of claim 5, wherein the processor is further configured to perform a fast Fourier transform (FFT) operation for the reception component and the second reception component in order to calculate the distance between the first apparatus and the second apparatus.

7. The first apparatus of claim 5, wherein the transmission signal includes a first transmission component for the first frequency and a second transmission component for the second frequency, and a phase of the first transmission component and a phase of the second transmission component are the same.

8. The first apparatus of claim 5, wherein the processor is further configured to communicate, via the transceiver, with at least one of a mobile terminal, a network device, and/or an autonomous driving vehicle.

\* \* \* \* \*